United States Patent
Yang et al.

(10) Patent No.: US 11,410,385 B2
(45) Date of Patent: *Aug. 9, 2022

(54) GENERATION OF A CONTROL STREAM FOR A TILE

(71) Applicant: Imagination Technologies Limited, Kings Langley (GB)

(72) Inventors: Xile Yang, Rickmansworth (GB); Lorenzo Belli, Hemel Hempstead (GB); Richard Broadhurst, Chipperfield (GB)

(73) Assignee: Imagination Technologies Limited, Kings Langley (GB)

( * ) Notice: Subject to any disclaimer, the term of this patent is extended or adjusted under 35 U.S.C. 154(b) by 28 days.

This patent is subject to a terminal disclaimer.

(21) Appl. No.: 16/929,226

(22) Filed: Jul. 15, 2020

(65) Prior Publication Data

US 2020/0342666 A1    Oct. 29, 2020

Related U.S. Application Data

(63) Continuation of application No. 16/162,182, filed on Oct. 16, 2018, now Pat. No. 10,733,796, which is a
(Continued)

(30) Foreign Application Priority Data

Apr. 29, 2016  (GB) ...................... 1607524
Apr. 29, 2016  (GB) ...................... 1607526
Apr. 29, 2016  (GB) ...................... 1607528

(51) Int. Cl.
*G06F 15/00*     (2006.01)
*G06T 17/20*     (2006.01)
(Continued)

(52) U.S. Cl.
CPC .............. *G06T 17/20* (2013.01); *G06T 11/40* (2013.01); *G06T 15/005* (2013.01); *G06T 17/10* (2013.01);
(Continued)

(58) Field of Classification Search
CPC . G06T 2210/12; G06T 2210/21; G06T 17/10; G06T 17/20; G06T 11/40; G06T 15/005
(Continued)

(56) References Cited

U.S. PATENT DOCUMENTS 6,597,363 B1 *  7/2003  Duluk, Jr ............. G06T 15/005
                                              345/506
7,400,325 B1    7/2008  Gimby et al.
(Continued)

FOREIGN PATENT DOCUMENTS

GB    2401522 A    11/2004
GB    2511817 A    9/2014

OTHER PUBLICATIONS

Fuchs H, Poulton J, Eyles J, Greer T, Goldfeather J, Ellsworth D, Molnar S, Turk G, Tebbs B, Israel L. Pixel-planes 5: A heterogeneous multiprocessor graphics system using processor-enhanced memories. ACM Siggraph Computer Graphics. Jul. 1, 1989;23(3):79-88.*
(Continued)

*Primary Examiner* — Phu K Nguyen
(74) *Attorney, Agent, or Firm* — Potomac Law Group, PLLC; Vincent M DeLuca

(57) ABSTRACT

A method of processing primitives within a tiling unit of a graphics processing system is described. The method comprises determining whether a primitive falls within a tile based on positions of samples within each pixel. If it is determined that the primitive does fall within a tile based on the positions of samples within pixels in a tile, an association
(Continued)

between the tile and the primitive is stored to indicate that the primitive is present in the tile. For example, an identifier for the primitive may be added to a control stream for the tile to indicate that the primitive is present in the tile. Various different methods are described to make the determination and these may be used separately or in any combination.

20 Claims, 19 Drawing Sheets

Related U.S. Application Data continuation of application No. 15/499,038, filed on Apr. 27, 2017, now Pat. No. 10,140,761.

(51) Int. Cl.
*G06T 11/40* (2006.01)
*G06T 15/00* (2011.01)
*G06T 17/10* (2006.01)

(52) U.S. Cl.
CPC ...... *G06T 2210/12* (2013.01); *G06T 2210/21* (2013.01)

(58) Field of Classification Search
USPC ........................................................ 345/418
See application file for complete search history.

(56) References Cited

U.S. PATENT DOCUMENTS

| | | | |
|---|---|---|---|
| 8,692,829 B2 | 4/2014 | Hakura et al. | |
| 8,704,836 B1 | 4/2014 | Rhoades et al. | |
| 9,495,781 B2 | 11/2016 | Lum et al. | |
| 9,754,344 B2 | 9/2017 | Brothers et al. | |
| 10,140,761 B2* | 11/2018 | Yang | G06T 11/40 |
| 10,733,796 B2* | 8/2020 | Yang | G06T 11/40 |
| 10,832,371 B2* | 11/2020 | Doyle | G06F 9/5077 |
| 2011/0080406 A1 | 4/2011 | Hakura et al. | |
| 2013/0342547 A1 | 12/2013 | Lum et al. | |
| 2019/0051047 A1* | 2/2019 | Yang | G06T 17/20 |
| 2020/0320776 A1* | 10/2020 | Doyle | G06T 9/001 |
| 2020/0342666 A1* | 10/2020 | Yang | G06T 17/10 |
| 2021/0279954 A1* | 9/2021 | Yang | G06T 17/10 |

OTHER PUBLICATIONS

Geotiff, The Hacks of Life: GeoTIFF and Off-By-One, Jul. 7, 2009.*
Antochi et al., "Scene Management Models and Overlap Tests for Tile-Based Rendering," Proceedings of the EUROMICRO Systems on Digital System Design (DSD '04), Aug. 31, 2004, pp. 424-431.
Woo et al., "Fast Tile-Binning Method by Detecting ID-Overlapped Primitives," 2013 IEEE International Conference on Consumer Electronics (ICCE), Jan. 11, 2013, pp. 147-148.
Direct3D 11.3 Functional Specification, Version 1.16, Apr. 23, 2015.
The Ryg Blog, "A Trip Through the Graphics Pipeline 2011, part 8," Jul. 10, 2011, https://giesen.wordpress.com/2011/07/09/a-trip-through-the-graphics-pipeline-2011-index.

* cited by examiner

GENERATION OF A CONTROL STREAM FOR A TILE

CROSS REFERENCE TO RELATED APPLICATIONS AND CLAIM OF PRIORITY

This application is a continuation under 35 U.S.C. 120 of copending application Ser. No. 16/162,182 filed Oct. 16, 2018, which is a continuation of prior application Ser. No. 15/499,038 filed Apr. 27, 2017, now U.S. Pat. No. 10,140, 761, which claims foreign priority under 35 U.S.C. 119 from United Kingdom Application Nos. GB1607528.5, GB1607526.9, and GB1607524.4, all filed Apr. 29, 2016.

BACKGROUND

Graphics processing systems are used to process graphics data. For example, an application running on a computing system may need to render an image of a three dimensional (3D) scene for display to a user. The application can send graphics data to a graphics processing system to be rendered, wherein the graphics data describes primitives to be rendered. As is known in the art, primitives are usually convex polygons, such as triangles or convex quadrilaterals, wherein a primitive typically has its position in the rendering space of the graphics processing system defined by the position of its vertices, and may have its appearance defined by other attributes such as colour or texture attributes. An object in a scene may be represented by one or more primitives. As graphics processing systems progress, their capability to render complex images improves, and as such applications make use of this and provide more complex images for graphics processing systems to render. This means that the number of primitives in images tends to increase, so the ability of a graphics processing system to process the primitives efficiently becomes more important.

One known way of improving the efficiency of a graphics processing system is to render an image in a tile-based manner. In this way, the rendering space into which primitives are to be rendered is divided into a plurality of tiles, which can then be rendered independently from each other. In order to render primitives, a rendering unit uses memory to store intermediate results (e.g. depth values and primitive identifiers, etc.) for different sample positions. If the rendering unit operates on a tile at a time then most (or all) of this memory can be situated "on-chip", i.e. on the Graphics Processing Unit (GPU), which might not be possible if the whole rendering space is rendered at once. Therefore, in a tile-based graphics system, the number of read and write operations between the GPU and an off-chip memory (i.e. which may be referred to as "system memory") is typically reduced compared to a non-tile-based graphics system. Since read and write operations between the GPU and the system memory are typically very slow and use lots of power (compared to operations performed within the GPU), tile-based graphics systems are often more efficient (in terms of power and speed) than non-tile-based graphics systems. A tile-based graphics system includes a tiling unit to tile the primitives. That is, the tiling unit determines, for a primitive, which of the tiles of a rendering space the primitive is in. Then, when a rendering unit renders the tile, it can be given information indicating which primitives should be used to render the tile.

For example, FIG. 1 shows some elements of a tile-based graphics processing system 100 which may be used to render an image of a 3D scene. The graphics processing system 100 comprises a graphics processing unit (GPU) 102 and two portions of memory $104_1$ and $104_2$. It is noted that the two portions of memory $104_1$ and $104_2$ may, or may not, be parts of the same physical memory, and both memories $104_1$ and $104_2$ may be situated "off-chip", i.e. not on the same chip as the GPU 102. Communication between the memories ($104_1$ and $104_2$) and the GPU 102 may take place over a communications bus in the system 100.

The GPU 102 comprises a pre-processing module 106, a tiling unit 108 and a rendering unit 110. The tiling unit 108 comprises processing logic 112 and a data store 114, and the rendering unit 110 comprises a hidden surface removal (HSR) module 116 and a texturing/shading module 118. The graphics processing system 100 is arranged such that graphics data describing a sequence of primitives provided by an application is received at the pre-processing module 106. The pre-processing module 106 performs functions such as geometry processing including clipping and culling to remove primitives which do not fall into a visible view. The pre-processing module 106 may also project the primitives into screen-space. The pre-processing module 106 outputs primitives to the tiling unit 108.

The tiling unit 108 receives the primitives from the pre-processing module 106 and determines which of the primitives are present within each of the tiles of the rendering space of the graphics processing system 100. A primitive may be in one or more of the tiles of the rendering space. The tiling unit 108 assigns primitives to tiles of the rendering space by creating display lists for the tiles, wherein the display list for a tile includes indications of primitives (i.e. primitive IDs) which are present in the tile. The display lists and the primitives are outputted from the tiling unit 108 and stored in the memory $104_1$. The rendering unit fetches the display list for a tile and the primitives relevant to that tile from the memory $104_1$, and the HSR module 116 performs hidden surface removal to thereby remove fragments of primitives which are hidden in the scene. The remaining fragments are passed to the texturing/shading module 118 which performs texturing and/or shading on the fragments to determine pixel colour values of a rendered image which can be passed to the memory $104_2$ for storage in a frame buffer. The rendering unit 110 processes primitives in each of the tiles and when the whole image has been rendered and stored in the memory $104_2$, the image can be outputted from the graphics processing system 100 and, for example, displayed on a display. In the example shown in FIG. 1, the tile-based graphics processing system 100 is a deferred rendering system, meaning that the rendering unit 110 performs hidden surface removal on a primitive fragment prior to performing texturing and/or shading on the primitive fragment in order to render the scene. However, in other examples, graphics processing systems might not be deferred rendering systems, such that texturing and/or shading is performed on a primitive fragment before hidden surface removal is performed on the primitive fragment.

FIG. 2 shows an example of a rendering space 202 which has been divided into an 8×12 array of tiles 204, wherein the tile in the $m^{th}$ row and the $n^{th}$ column is referred to as $204_{mn}$. A primitive 206 is illustrated. The tiling unit 108 operates to determine which of the tiles 204 the primitive 206 is in. The primitive 206 is "in" a tile 204 if the primitive 206 at least partially overlaps with the tile 204. The tiling unit 108 determines a bounding box 208 by finding the minimum and maximum x and y coordinates of the three vertices of the primitive 206 and forming the bounding box 208 from those coordinates. The tiling unit 108 can thereby determine that the primitive 206 is not in any of the tiles 204 which are not in the bounding box 208. A tile 204 is "in" the bounding box 208 if the tile 204 at least partially overlaps with the bounding box 208. In some examples, the bounding box may be determined at tile-resolution, whereby the bounding box may be increased in size such that the edges of the bounding box fall on tile boundaries. In FIG. 2, the tiles which are dotted (i.e. the top and bottom rows of tiles, the first column and the last two columns of tiles of the rendering space 202) are outside of the bounding box 208 and therefore, on that basis, the tiling unit 108 can determine that the primitive 206 is not in those tiles. In a very simple implementation, the tiling unit 108 might simply indicate that the primitive is in all of the tiles in the bounding box 208. However, this means that the primitive is indicated as being in some tiles which it is not actually in. This can lead to additional memory consumption due to the storage of unnecessary primitives and/or primitive IDs in memory $104_1$, and inefficiencies in the rendering unit 110 as primitives are read from memory $104_1$ and are processed for tiles in which they are not visible. Therefore, it is generally preferable for the tiling unit 108 to determine which of the tiles in the bounding box 208 the primitive is in.

For each tile in the bounding box 208 (e.g. each of the white tiles in FIG. 2) tiling calculations can be performed to determine whether the primitive 206 is in the tile. For example, the tiling calculations to determine whether the primitive 206 is in a tile 204 might include calculations for each edge of the primitive. For example, as illustrated in FIG. 3, equations representing edge lines ($302_1$, $302_2$ and $302_3$) defining the edges of the primitive 206 are determined using the locations of the vertices ($304_1$, $304_2$ and $304_3$) of the primitive 206. Then for each edge line 302, a test can be performed to determine whether a tile 204 is inside or outside the respective edge line 302 by comparing a position of a test point in the tile with the equation of the edge line 302. The test point in the tile may be different for testing with respect to different edges, i.e. the test point may be edge-specific. For example, for testing whether a tile is inside edge line $302_1$ the test point is in the bottom left of the tile; for testing whether a tile is inside edge line $302_2$ the test point is in the top left of the tile; and for testing whether a tile is inside edge line $302_3$ the test point is in the bottom right of the tile. If it is determined that the tile is inside all of the edge lines 302 then it is determined that the primitive is in the tile. However, if it is determined that the tile is outside any of the edge lines 302 then it is determined that the primitive is not in the tile.

The tiling calculations may be performed for each of the tiles in the bounding box 208 in order to determine whether the primitive is in the respective tiles. For each edge of the primitive, and for each tile in the bounding box, the comparison of the position of the edge-specific test point in the tile with the equation of the appropriate edge line typically involves performing one or more floating point operations. Floating point operations are costly to perform (in terms of time and power consumption). This may cause a problem, particularly due to the tendency for the number of primitives in an image to increase, because the number of floating point operations involved in the tiling process may become large enough to significantly detrimentally affect the performance of the graphics processing system 100. Therefore, it would generally be beneficial to reduce the time and power that is consumed in the tiling process.

The embodiments described below are provided by way of example only and are not limiting of implementations which solve any or all of the disadvantages of known method for tile-based rendering.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of determining associations between tiles and primitives within a tiling unit of a graphics processing system is described. The method comprises determining whether a primitive falls within a tile based on positions of samples within pixels in the tile. If it is determined that the primitive does fall within a tile based on the positions of samples within pixels in the tile, data can be stored to indicate which of the tiles the primitives is determined to be in. For example, if it is determined that the primitive does fall within a tile, an identifier for the primitive may be added to a control stream for the tile and if it is determined that the primitive does not fall within the tile, the identifier for the primitive is not added to the control stream for the tile. In alternative examples, the associations between primitives and tiles may be stored in different ways. For example, in some alternative examples, a list of tiles could be stored for each primitive, wherein the list of tiles for a primitive includes tile IDs of the tiles in which the primitive is present. Various different methods are described to make the determination and these may be used separately or in any combination.

A first aspect provides a method of processing primitives within a tiling unit of a graphics processing system, the method comprising: determining whether a primitive falls within a tile based on positions of samples within pixels in the tile, said determining comprising: generating intersection points between edges of the primitive and boundaries of the tile; forming a sub-polygon inside the tile by replacing vertices of the primitive outside the tile with the intersection points; and determining whether the sub-polygon overlaps any of the sample positions within the tile, to thereby determine whether the primitive falls within the tile; and in response to determining that a primitive does fall within a tile based on the positions of samples within pixels in the tile, storing an association between the tile and the primitive to indicate that the primitive is present in the tile.

A second aspect provides a graphics processing system comprising a tiling unit for processing primitives for each of a plurality of tiles, the tiling unit being configured to: determine whether a primitive falls within a tile based on positions of samples within pixels in the tile by: generating intersection points between edges of the primitive and boundaries of the tile; forming a sub-polygon inside the tile by replacing vertices of the primitive outside the tile with the intersection points; and determining whether the sub-polygon overlaps any of the sample positions within the tile, to thereby determine whether the primitive falls within the tile; and causing an association between the tile and the primitive to be stored to indicate that the primitive is present in the tile in response to determining that the primitive does fall within the tile based on the positions of samples within pixels in the tile.

A third aspect provides an integrated circuit manufacturing system comprising: a non-transitory computer readable storage medium having stored thereon a computer readable description of an integrated circuit that describes a graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description, wherein the graphics processing system comprises a tiling unit for processing primitives for each of a plurality of tiles, the tiling unit being configured to: determine whether a primitive falls within a tile based on positions of samples within pixels in a tile by: generating intersection points between edges of the primitive and boundaries of the tile; forming a sub-polygon inside the tile by replacing vertices of the primitive outside the tile with the intersection points; and determining whether the sub-polygon overlaps any of the sample positions within the tile, to thereby determine whether the primitive falls within the tile; and cause an association between the tile and the primitive to be stored to indicate that the primitive is present in the tile in response to determining that a primitive does fall within a tile based on the positions of samples within pixels in the tile.

The graphics processing system which implements one or more of the methods described herein may be embodied in hardware on an integrated circuit. There may be provided a method of manufacturing, at an integrated circuit manufacturing system, a graphics processing system which implements one or more of the methods described herein. There may be provided an integrated circuit definition dataset that, when processed in an integrated circuit manufacturing system, configures the system to manufacture a graphics processing system which implements one or more of the methods described herein. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing system which implements one or more of the methods described herein.

There may be provided an integrated circuit manufacturing system comprising: a non-transitory computer readable storage medium having stored thereon a computer readable integrated circuit description that describes the graphics processing system which implements one or more of the methods described herein; a layout processing system configured to process the integrated circuit description so as to generate a circuit layout description of an integrated circuit embodying the graphics processing system which implements one or more of the methods described herein; and an integrated circuit generation system configured to manufacture the graphics processing system which implements one or more of the methods described herein according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described, in detail, with reference to the accompanying drawings, in which.

Figure 1:
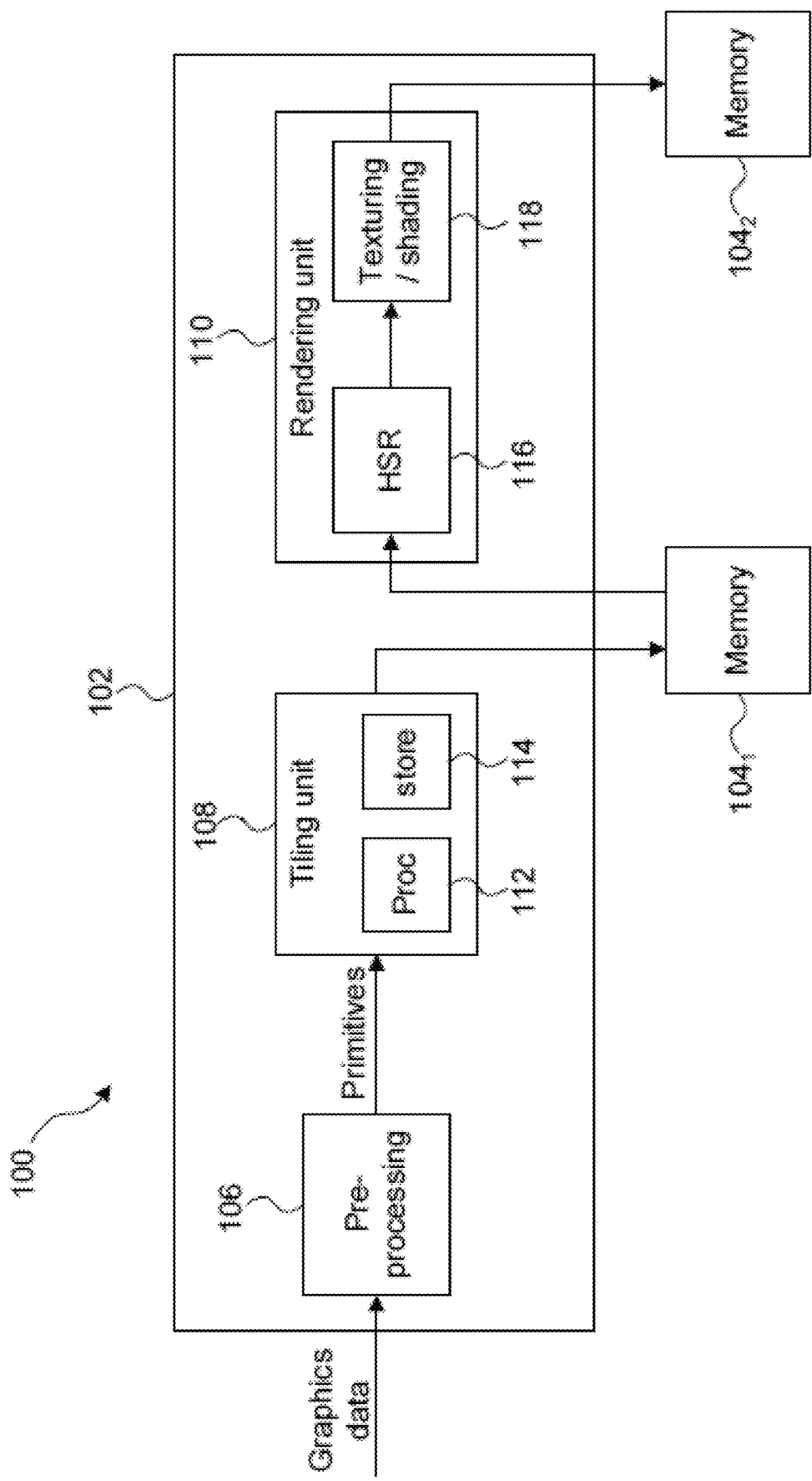
FIG. 1 is a schematic diagram of a graphics processing system.
Figure 2:
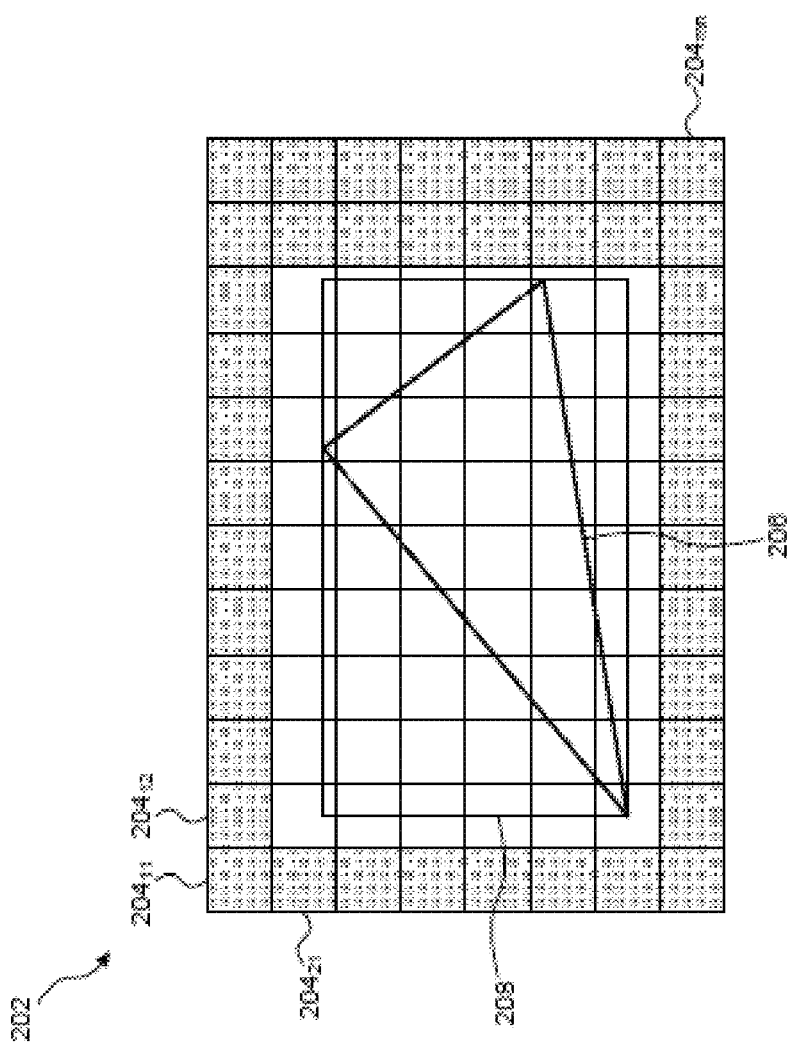
FIG. 2 shows a primitive in tiles of a rendering space.
Figure 3:
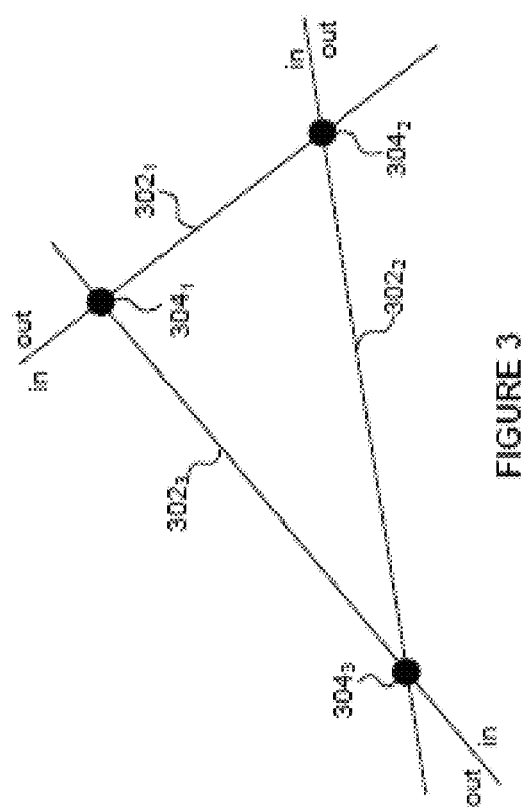
FIG. 3 illustrates edge lines which define the edges of a primitive.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

As described above, a tiling unit within a GPU receives the primitives and determines which of the primitives are present within each of the tiles of the rendering space of the graphics processing system. The tiling unit outputs data which can be used to indicate which of the tiles a primitive is in. If a primitive is determined to be present in a tile then an association between the primitive and the tile is stored, thereby indicating that the primitive is present in the tile. In most of the examples described herein the tiling unit outputs a control stream (which may also be referred to as a control list or display list) for each tile, where a control stream comprises one or more primitive identifiers (IDs) for primitives which are present in the tile. However, it is to be understood that in some other examples, the data indicating the associations between primitives and tiles (i.e. which primitives are present in which tiles) could take a different form, e.g. for each primitive a list of tile IDs indicating the tiles in which the primitive is present could be stored. This alternative way of storing the associations between primitives and tiles could be particularly useful in an immediate mode renderer.

Described herein are a number of methods for determining whether to include a primitive ID in the control stream for a tile and these methods may be implemented independently of each other, or any two or more of these methods may be implemented together. The methods (which may also be referred to as methods for forming the control streams) may be implemented within a tiling unit and an improved tiling unit (which implements any one or more of the methods) is also described herein.

The methods described herein determine whether a primitive falls within a tile based on the positions of a plurality of sample points within pixels in the tile. The analysis based on the positions of sample points per tile (where there may be one or more sample points per pixel) as described herein reduces the number of primitive IDs that are included in a control stream for a tile but are subsequently discarded in the rendering unit (e.g. during rasterization) after they have been fetched from memory. The rendering unit is configured to determine rendered values at the sample positions within a tile, and a primitive may be relevant to the rendering at a sample position if the primitive overlaps the sample position.

Where two or more of the methods described herein are combined, only those primitives that are identified as needing to be added to the control stream for a tile in a first method (i.e. those primitives which are not excluded from the control stream using the first method) are fed into the next method (e.g. as members of a set of candidate primitives). Once a method has identified that a primitive does not need to be added to a control stream for a tile, no further analysis of the primitive is performed. An exception to this is where a primitive is divided into a plurality of sub-polygons and in such examples, each sub-polygon is tested individually. Once a method has identified based on one of the plurality of sub-polygons that the sub-polygon does not need to be added to a control stream for a tile, no further analysis of that sub-polygon is performed; however, the ID for the primitive may still be added to the control stream for the tile as a consequence of analysis of another of the sub-polygons formed from the primitive. A primitive divided into a plurality of sub-polygons is added to the control stream for a tile if any one or more of the sub-polygons is needed in the tile.

Those primitives which are initially included in a control stream of a tile but are then fetched and discarded in the rendering unit (e.g. during rasterization) may be referred to as 'non-contributing primitives' or 'invisible primitives' as they have no effect on the rendered output of the tile. The methods and apparatus described herein reduce the number of non-contributing primitives which are included in a control stream for a tile.

Figure 17:
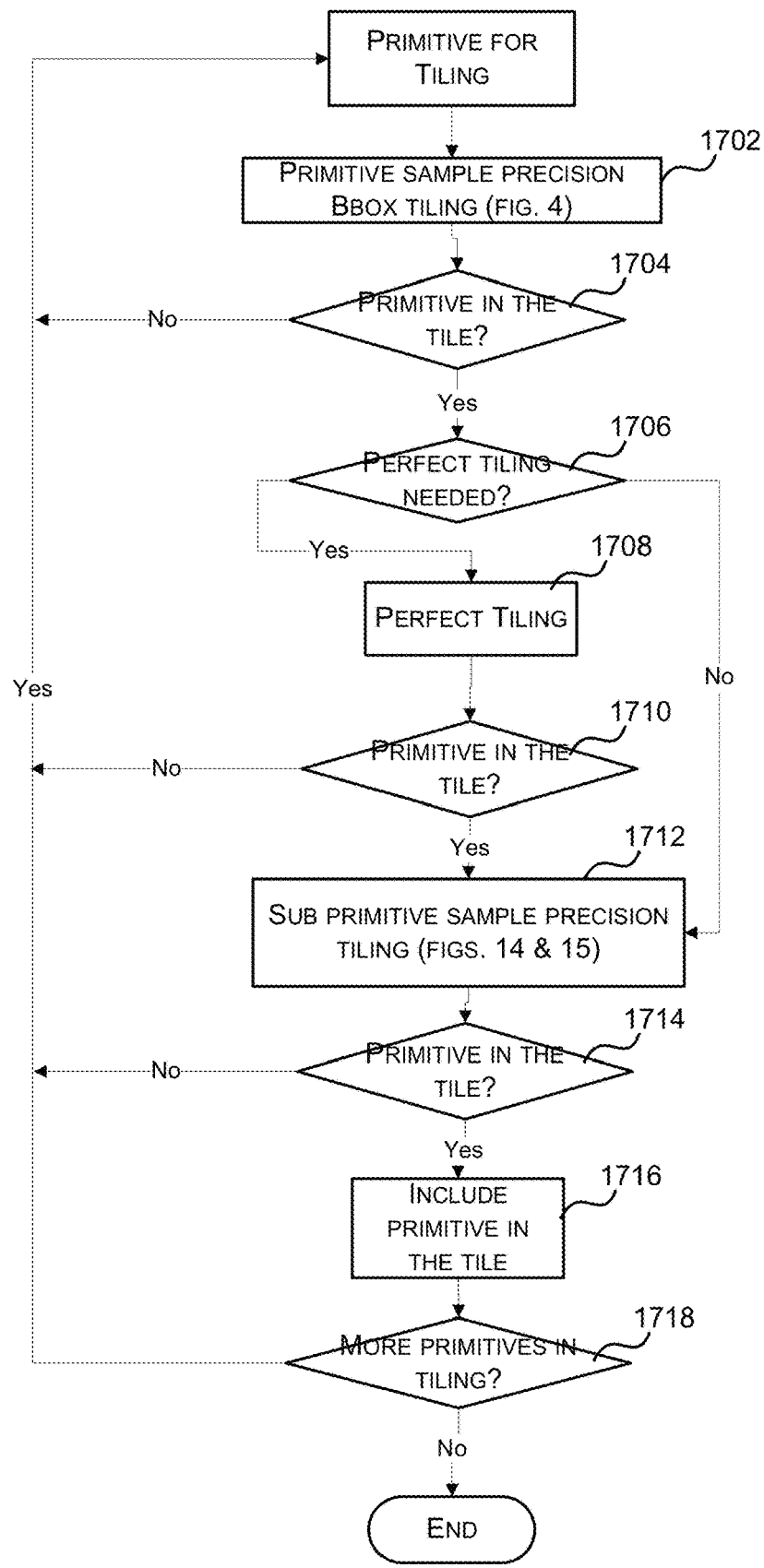
FIG. 17 is a flow diagram of a fifth example method of generating control streams for tiles in a tiling unit of a GPU.

By reducing the number of non-contributing primitives included in a control stream for a tile using the methods described herein, unnecessary workload in the rendering unit is reduced (i.e. the rendering unit fetches fewer non-contributing primitives so the amount of data transferred between the GPU and the system memory is reduced) and as triangle-size reduces, the proportional saving in processing load increases. Experimental results have shown that by using the three methods described herein together (e.g. as shown in FIG. 17), the number of primitives included in control streams can be reduced and the percentage of non-contributing primitives fetched and then discarded by the rendering unit can be reduced by a factor of the order of 10 in some examples (with the most significant improvements being seen in examples where there were many small primitives).

The graphics processing system 100 shown in FIG. 1 may be used to implement methods of the examples described herein. As described above, the graphics processing system 100 is a tile-based deferred rendering graphics processing system which includes a GPU 102 and two portions of memory $104_1$ and $104_2$. As mentioned above, the two portions of memory $104_1$ and $104_2$ may, or may not, be parts of the same physical memory, and both memories $104_1$ and $104_2$ may be situated "off-chip", i.e. not on the same chip as the GPU 102. Communication between the memories ($104_1$ and $104_2$) and the GPU 102 may take place over a communications bus in the system 100. The GPU 102 comprises a pre-processing module 106, a tiling unit 108 and a rendering unit 110. The tiling unit 108 comprises processing logic 112 and a data store 114, and the rendering unit 110 comprises a hidden surface removal (HSR) module 116 and a texturing/shading module 118.

In operation, the graphics processing system 100 receives graphics data (e.g. from an application) describing a sequence of primitives. The pre-processing module 106 performs functions such as geometry processing including clipping and culling to remove primitives which do not fall into a visible view. The pre-processing module 106 may also project the primitives into screen-space. The pre-processing module 106 outputs primitives to the tiling unit 108.

The tiling unit 108 determines which of the primitives are present within each of the tiles of the rendering space of the graphics processing system 100. The processing logic 112 of the tiling unit 108 performs the operations of the tiling unit 108 (including determining whether to include a primitive ID in the control stream for a tile using one or more of the methods described herein), and the data store 114 stores data of intermediate results of the tiling process, such as results of tiling calculations and partially filled control streams. The processing logic 112 may be implemented in dedicated hardware designed specifically for performing the operations of the tiling unit 108. Alternatively, the processing logic 112 may be implemented by executing software on a processor wherein the software is written such that when it is executed it causes the processor to perform the operations of the tiling unit 108.

In various examples, once all of the primitives for a render have been tiled then the control streams are complete and they are passed to the off-chip memory $104_1$ for storage therein. In other examples, the tiling unit 108 might not use an internal store (such as store 114) to store control streams, and instead primitive identifiers may be written directly to control streams in memory $104_1$ as tiling is performed. Furthermore, in some further examples, the internal store 114 may be implemented in the tiling unit 108, but the internal store 114 might not be big enough to store all of the control streams for all of the tiles at once. Therefore, the internal store 114 may be used to gather tiling results that can then be written out to memory $104_1$ in chunks (or "batches") as the tiling is performed. This can avoid inefficient memory access patterns when primitives are written to different control streams in memory $104_1$.

The rendering unit 110 can then render the primitives in each of the tiles in accordance with the control streams. In order to render the primitives for a tile, the rendering unit 110 retrieves the control stream from the memory $104_1$ for the tile. The rendering unit 110 can then retrieve the primitives indicated by the control stream as being in the tile currently being rendered. These primitives may be retrieved from the memory $104_1$. The rendering unit 110 then renders the primitives in the tile. In the example shown in FIG. 1, the rendering unit 110 implements deferred rendering whereby hidden surface removal is performed before texturing and/or shading, but in other examples non-deferred rendering may be implemented. The rendered result is then output and can be passed to the memory $104_2$ for storage, e.g. in a frame buffer. The rendering unit 110 processes primitives in each of the tiles and when the whole image has been rendered and stored in the memory $104_2$, the image can be outputted from the graphics processing system 100 and, for example, displayed on a display.

A first method of determining whether a primitive should be associated with a tile (e.g. whether a primitive ID should be added to a control stream for a tile) can be described with reference to FIGS. 4-6. As described above, this method may be implemented in a tiling unit 108.

Figure 4:
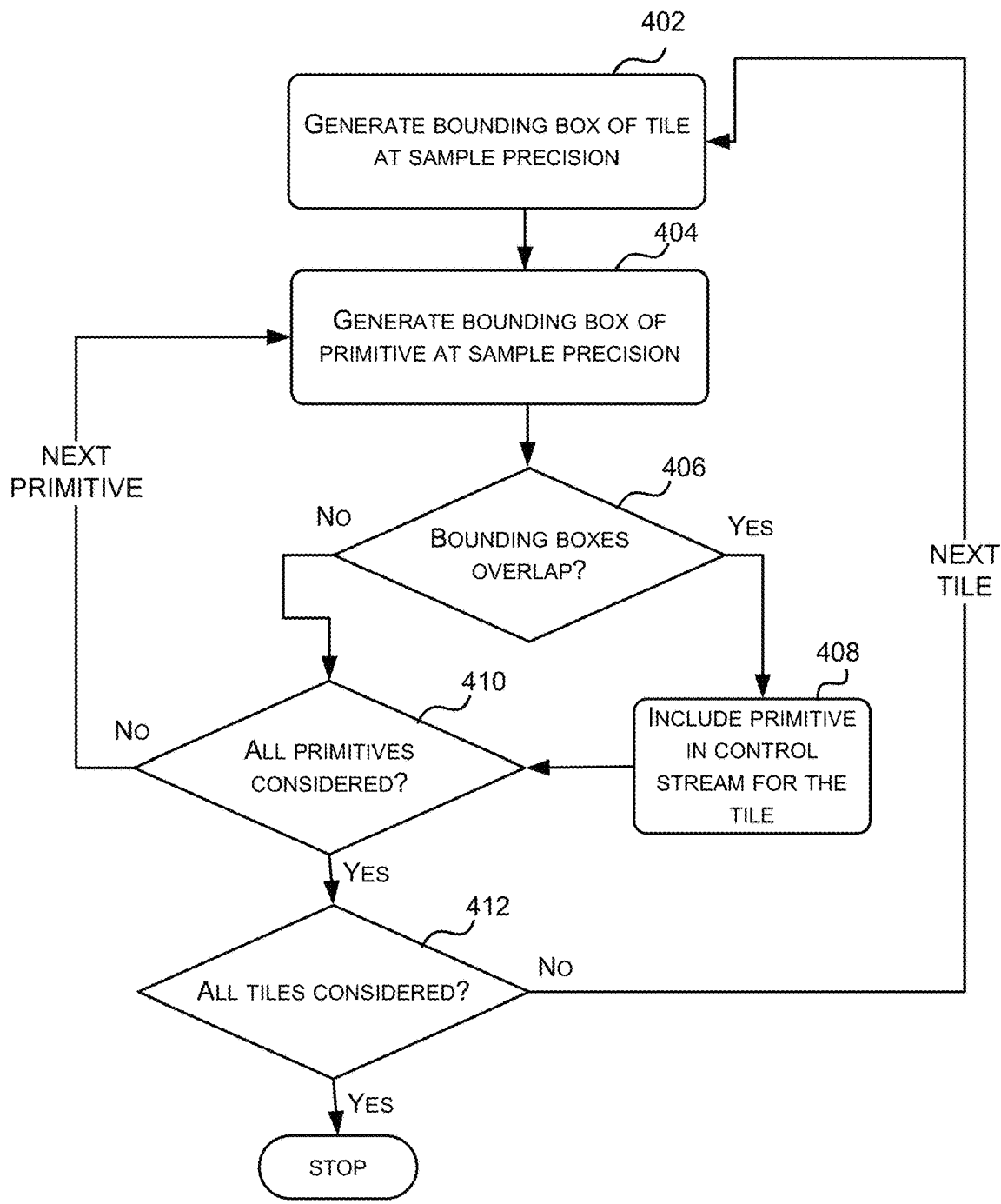
FIG. 4 is a flow diagram of a first example method of generating control streams for tiles in a tiling unit of a GPU.
Figure 5:
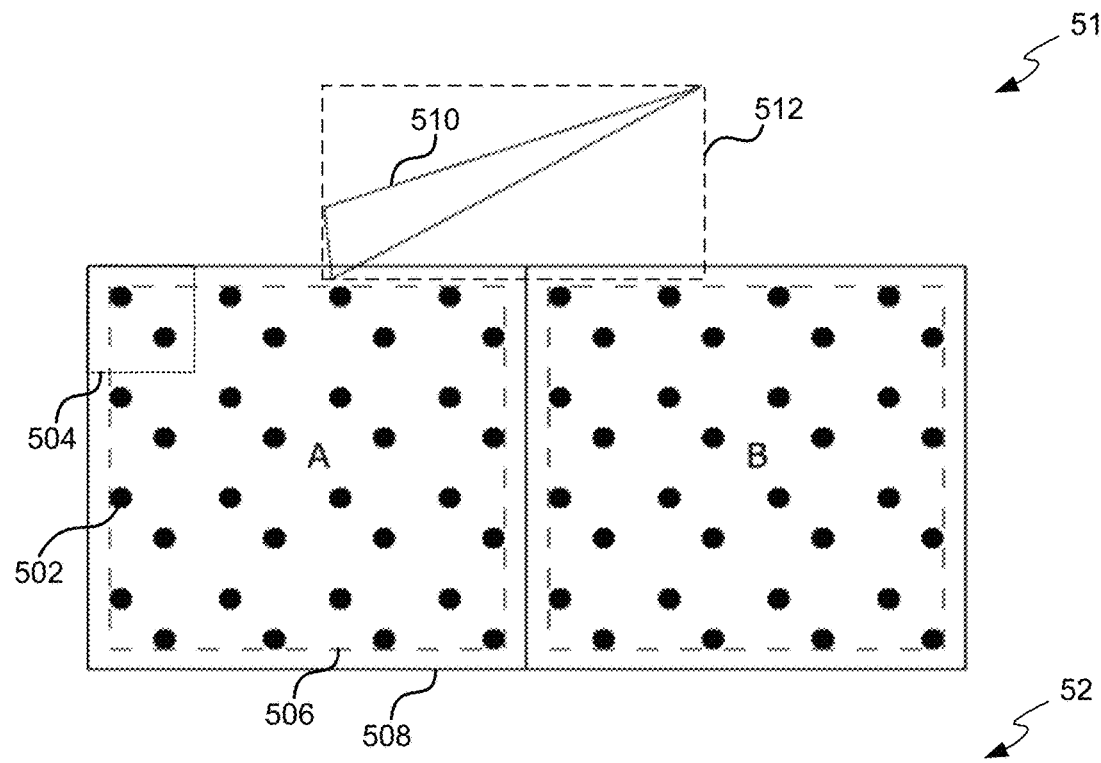
FIG. 5 is a schematic diagram showing an example primitive and its position with reference to one or more tiles.
Figure 5:
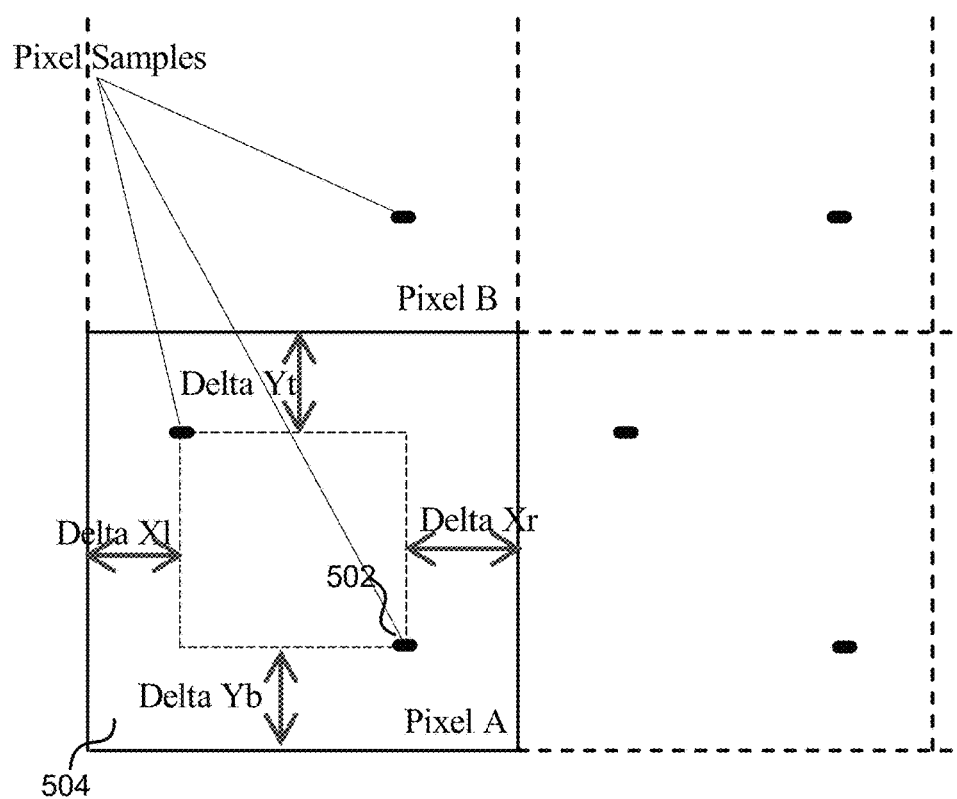

As shown in the flow diagram of FIG. 4, a bounding box 506 of a tile 508 is generated at sample precision (block 402) and this is shown graphically in the first diagram 51 in FIG. 5. As shown in FIG. 5, all the samples 502 in a tile 508 form a bounding box 506 that is smaller than the tile borders and this bounding box 506 may be referred to as the 'restricted sample bounding box' in a tile. The sample points may, for example, be at 1/16 pixel precision in 16.4 fixed point format (i.e. with 16 integer bits followed by 4 fractional bits), while the representation of X and Y coordinates on screen may be in 16.8 fixed point format (i.e. with 16 integer bits followed by 8 fractional bits).

The method then considers each primitive in a set of candidate primitives (which comprise all primitives or alternatively, the set may be a proper subset of a set comprising all primitives) and for each primitive 510 in the set, generates a bounding box 512 of the primitive at the sample precision being used (block 404), e.g. in 16.8 fixed point format. It is then determined if the two bounding blocks 506, 512 overlap (block 406) and if they overlap ('Yes' in block 406), the ID for the primitive 510 is added to the control stream for the tile (block 408).

As shown in FIG. 4, the method may iterate through each primitive in the set of candidate primitives to generate a control stream for a tile and then once all primitives in the set have been considered for a particular tile ('Yes' in block 410), the method may be repeated until a control stream has been generated for every tile ('Yes' in block 412). It will be appreciated, however, that aspects of the method may be performed in parallel (e.g. some or all of the tiles may be considered in parallel) and the set of candidate primitives may be the same for all tiles (e.g. where the candidate set comprises all primitives) or may be different for different tiles or groups of tiles. The method could alternatively iterate through each tile to add a primitive to each tile control stream where needed and then once all the tiles have been considered for a particular primitive the method may be repeated until all the primitives have been considered.

Using the method shown in FIG. 4, the primitive 510 is not added to the control stream for either of tiles A and B. This is in contrast to known methods which would add the ID of the primitive to the control stream for both tile A and tile B (because the bounding box 512 overlaps with the tile areas for tile A (denoted 508) and tile B) even though the bounding box of the primitive does not cover any sample point in the tile.

The generation of the bounding box of a tile at sample precision (in block 402) may be determined based on the distances between the samples inside a pixel and the boundary of the pixel and this is shown in more detail in the second diagram 52 in FIG. 5. As shown in FIG. 5, Delta Xl (which may also be written ΔXl) is the distance between the left boundary of a pixel and the minimum X value of all the samples inside the pixel, Delta Xr (which may also be written ΔXr) is the distance between the right boundary of a pixel and the maximum X value of all the samples inside the pixel. Similarly Delta Yt (which may also be written ΔYt) is the distance on the top pixel boundary and Delta Yb (which may also be written ΔYb) is the distance on the bottom pixel boundary. Although FIG. 5 shows multiple sample positions per pixel, in other examples there may only be a single sample position per pixel.

Given tile boundaries defined by four parameters which define the maximum and minimum extent of the tile along two perpendicular axes (X and Y) that are TileXmin, TileXmax, TileYmin, TileYmax, (i.e. such that the four corners of the tile have coordinates (TileXmin, TileYmax), (TileXmax, TileYmax), (TileXmax, TileYmin) and (TileXmin, TileYmin)) all in pixel precision (integer format), the bounding box of a tile at sample precision (e.g. 16.8 format) is defined by four parameters: TileXmin+Delta Xl, TileXmax−Delta Xr, TileYmin+Delta Yt, TileYmax−Delta Yb, which define the maximum and minimum extent of the bounding box of the tile at sample precision along the two perpendicular axes.

If the bounding box of a primitive at sample precision (as determined in block 404) is defined by four parameters PrimXmin, PrimXmax, PrimYmin, PrimYmax (which again define the maximum and minimum extent of the bounding box along the two perpendicular axes), then the bounding boxes do not overlap ('No' in block 406), i.e. the primitive is not considered to be in the tile, if:

PrimXmax<(TileXmin+Delta *Xl*) or

PrimXmin>(TileXmax−Delta *Xr*) or

PrimYmax<(TileYmin+Delta *Yt*) or

PrimYmin>(TileYmax−Delta *Yb*)

The elimination of primitives from a control stream using the method shown in FIG. 4 is performed without having to calculate the edge equations of any of the primitives. Where this method is used in combination with other methods (e.g. known methods and/or other methods described herein), it may be used first to eliminate one or more primitives and so avoid the computational effort that would otherwise be performed to calculate the edge equations of a primitive which is ultimately discarded because it has no effect on the rendered output (e.g. as shown in FIG. 17).

In the examples shown in FIG. 5, the number of samples 502 and the sample positions within each pixel 504 are the same. The method of FIG. 4 may still be used if the number of samples and/or sample positions differs between pixels, as can be described with reference to FIG. 6. In the example shown in FIG. 6, the "worst case" sample positions are used, i.e. a bounding box at sample precision 602 is defined which is guaranteed to encompass all of the sample positions in all of the pixels in the tile and then the bounding boxes do not overlap ('No' in block 406), i.e. the primitive is not considered to be in the tile, if:

$$PrimXmax<(TileXmin+\Delta Xl_{min}) \text{ or}$$

$$PrimXmin>(TileXmax-\Delta Xr_{min}) \text{ or}$$

$$PrimYmax<(TileYmin+\Delta Yt_{min}) \text{ or}$$

$$PrimYmin>(TileYmax-\Delta Yb_{min})$$

Figure 6:
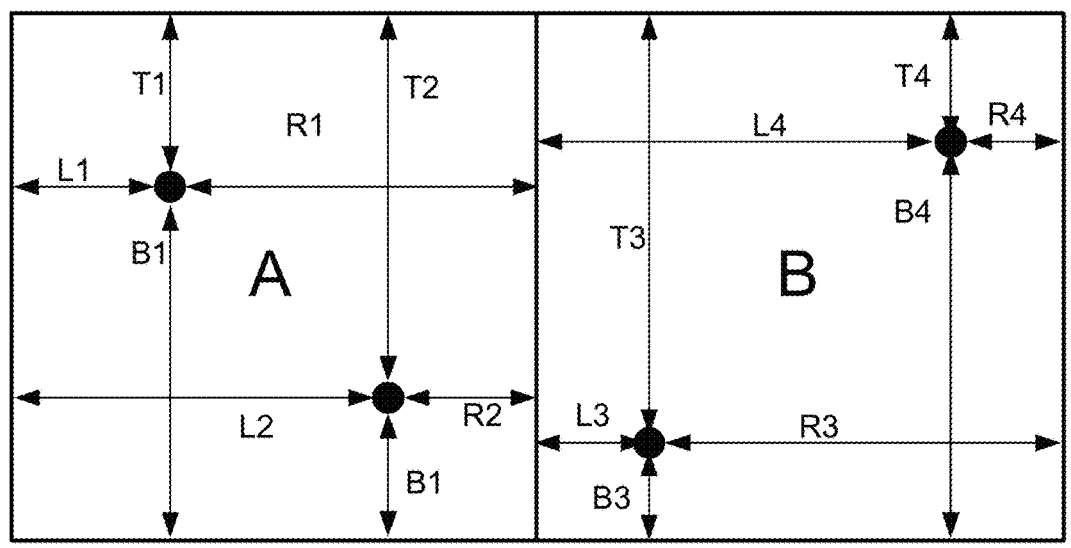
FIG. 6 is a schematic diagram showing sample positions within a pixel.
Figure 6:
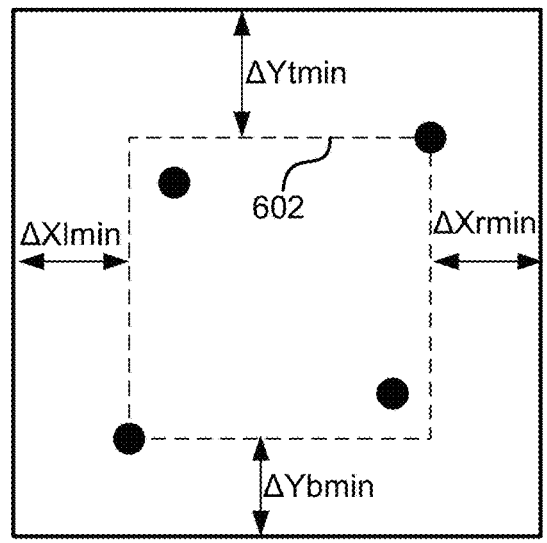

Where:

$$\Delta Xl_{min}=\min(L_1,L_2,\ldots)$$

$$\Delta Xr_{min}=\min(R_1,R_2,\ldots)$$

$$\Delta Yt_{min}=\min(T_1,T_2,\ldots)$$

$$\Delta Yb_{min}=\min(B_1,B_2,\ldots)$$

Where $L_x$, $R_x$, $T_x$, $B_x$ are the distances from a sample position x to each of the edges of the pixel (as shown in FIG. 6).

In an alternative to the method shown in FIG. 6, if there are different proper subsets of pixels with different numbers of samples and/or different sample positions, multiple bounding boxes for a tile at sample precision may be generated (in block 402), i.e. one for each proper subset, and then the bounding boxes do not overlap ('No' in block 406), i.e. the primitive is not considered to be in the tile, if:

$$PrimXmax<(TileXmin+\Delta Xl_x) \text{ or}$$

$$PrimXmin>(TileXmax-\Delta Xr_x) \text{ or}$$

$$PrimYmax<(TileYmin+\Delta Yt_x) \text{ or}$$

$$PrimYmin>(TileYmax-\Delta Yb_x)$$

where $\Delta Xl_x$, $\Delta Xr_x$, $\Delta Yt_x$, $\Delta Yb_x$ are the values for subset X.

A second method of determining whether a primitive should be associated with a tile (e.g. whether a primitive ID should be added to a control stream for a tile) can be described with reference to FIGS. 7-9. This method requires additional processing compared to the method described above with reference to FIGS. 4-6, but results in additional non-contributing primitives not being added to the control stream. As described below, the two methods may be used together (e.g. the candidate set of primitives considered by the second method may comprise only those primitives that are identified as needing to be added to the control stream for a tile in the first method). The method may be implemented in a tiling unit 108.

Figure 7:
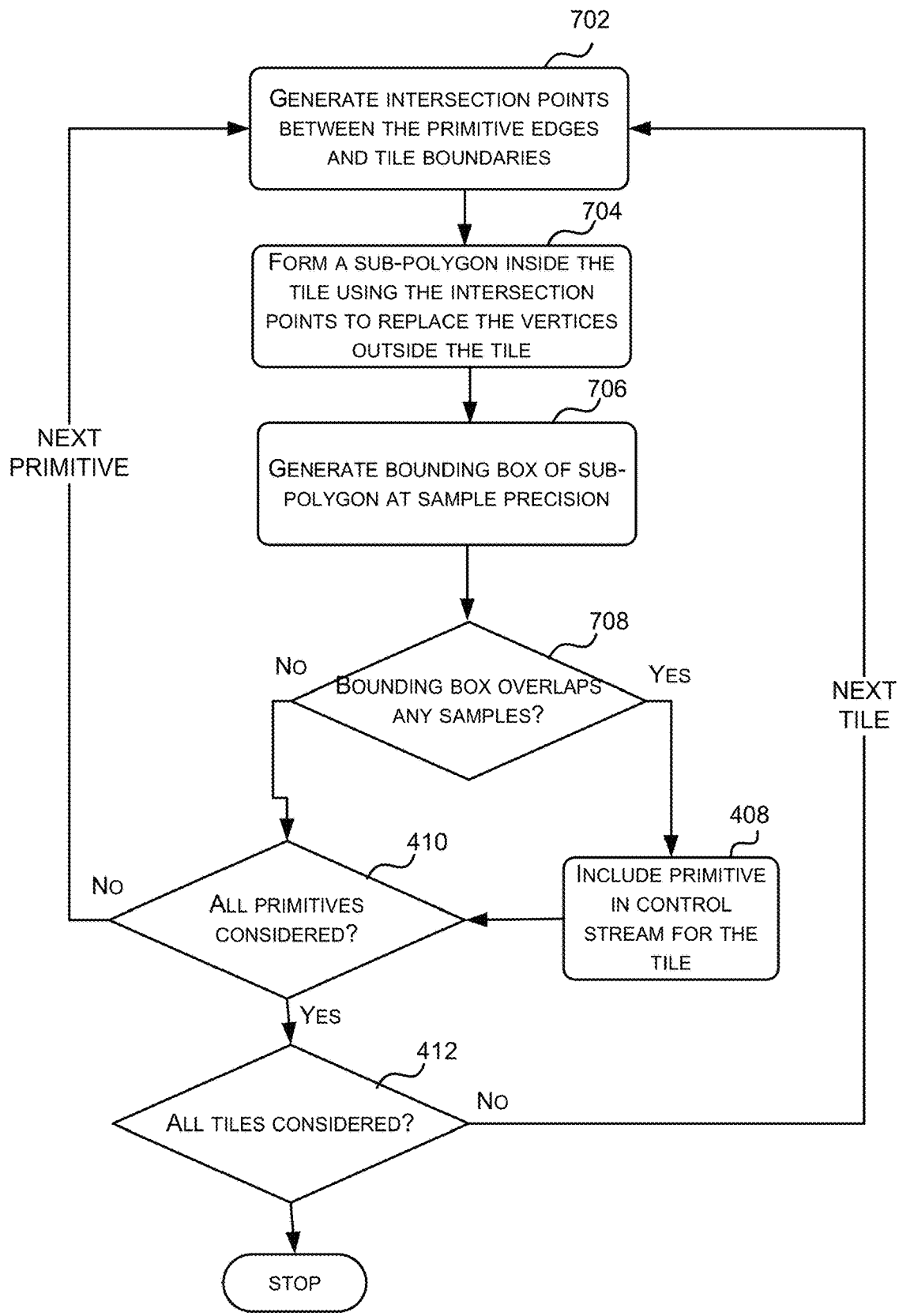
FIG. 7 is a flow diagram of a second example method of generating control streams for tiles in a tiling unit of a GPU.

As shown in the flow diagram of FIG. 7, the intersection points between the edges of a primitive (e.g. a triangle) are generated (block 702). Referring to the primitive 802 (with vertices V0, V1, V2) shown in FIG. 8, these intersection points are Va and Vb. Line equations of the edges of the primitive (e.g. the triangle) may be used to generate the intersection points between triangle edges and tile boundaries (in block 702). Although the method is described with reference to primitives which are triangles, the method may also be used for other primitive types (e.g. quads and lines).

Figure 8:
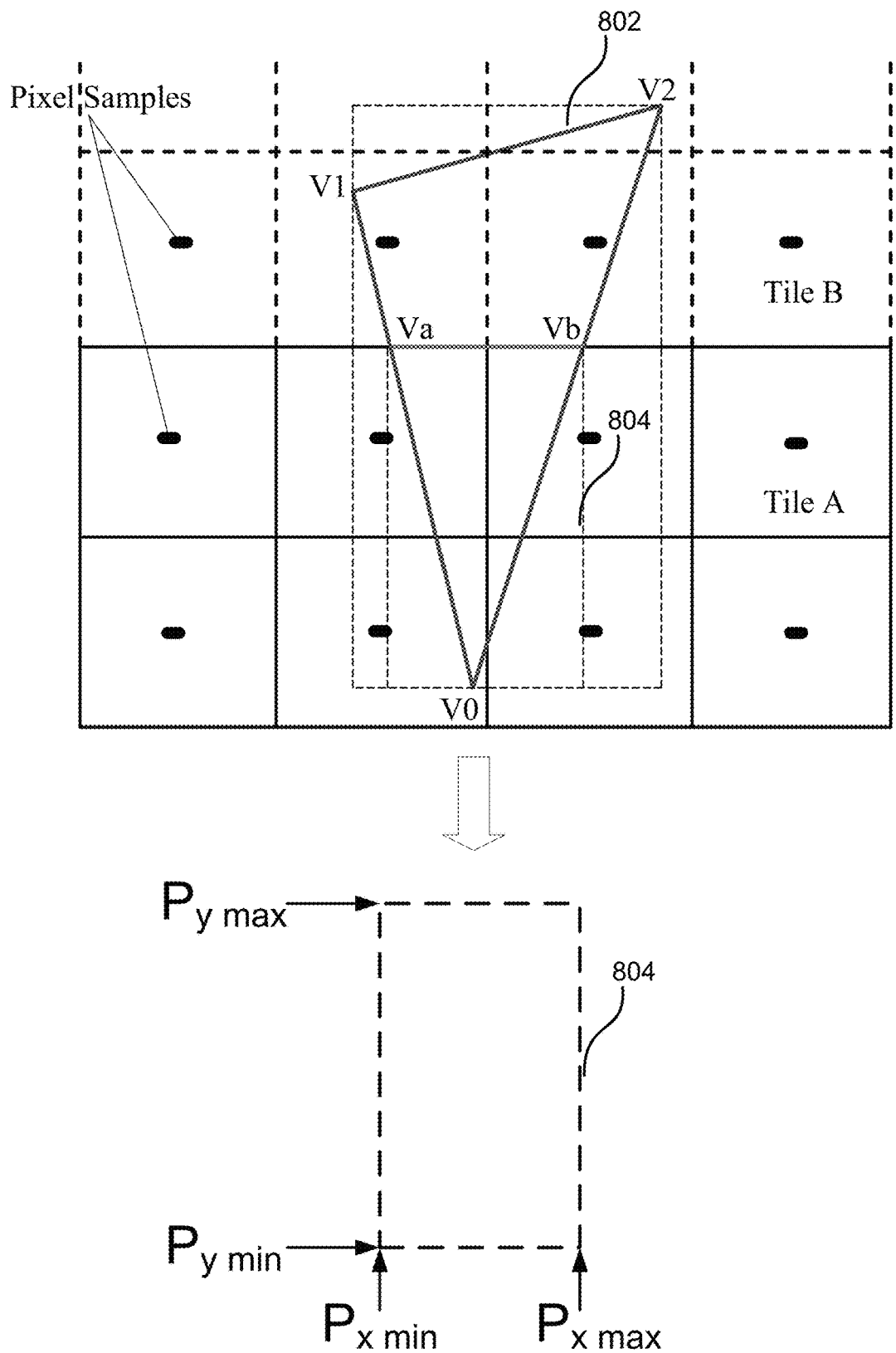
FIG. 8 is a schematic diagram showing an example primitive and its position with reference to one or more tiles.

Referring to the example shown in FIG. 8, the equation of the edge between V0 and V1 may have the form Ax+By+C=0. When the edge crosses the left tile boundary Xtileleft, then the coordinates of the intersection point are:

$$Xintersec=Xtileleft$$

$$Yintersec=-(C+A*Xtileleft)/B$$

When the edge crosses the right tile boundary Xtileright, then the coordinates of the intersection point are:

$$Xintersec=Xtileright$$

$$Yintersec=-(C+A*Xtileright)/B$$

When the edge crosses the top tile boundary Ytiletop, then the coordinates of the intersection point are:

$$Xintersec=-(C+B*Ytiletop)/A$$

$$Yintersec=Ytiletop$$

When the edge crosses the bottom tile boundary Ytilebottom, then the coordinates of the intersection point are:

$$Xintersec=-(C+B*Ytilebottom)/A$$

$$Yintersec=Ytilebottom$$

Once the intersection points have been generated (in block 702), a sub-polygon is then formed inside the tile using the intersection points to replace the vertices outside the tile (block 704). Referring again to the example shown in FIG. 8, intersection point Va replaces vertex V1 and intersection point Vb replaces vertex V2 as both V1 and V2 are outside Tile A.

A bounding box 804 for the sub-polygon (with vertices V0, Va, Vb) is generated at sample precision (block 706) and this sample precision bounding box of the sub-polygon is tested against the sample positions in the tile (block 708). Only if the bounding box of the sub-polygon 804 overlaps at least one sample position ('Yes' in block 708), is the ID for the primitive 802 added to the control stream for the tile (block 408), thereby associating the primitive 802 with the tile.

Figure 9:
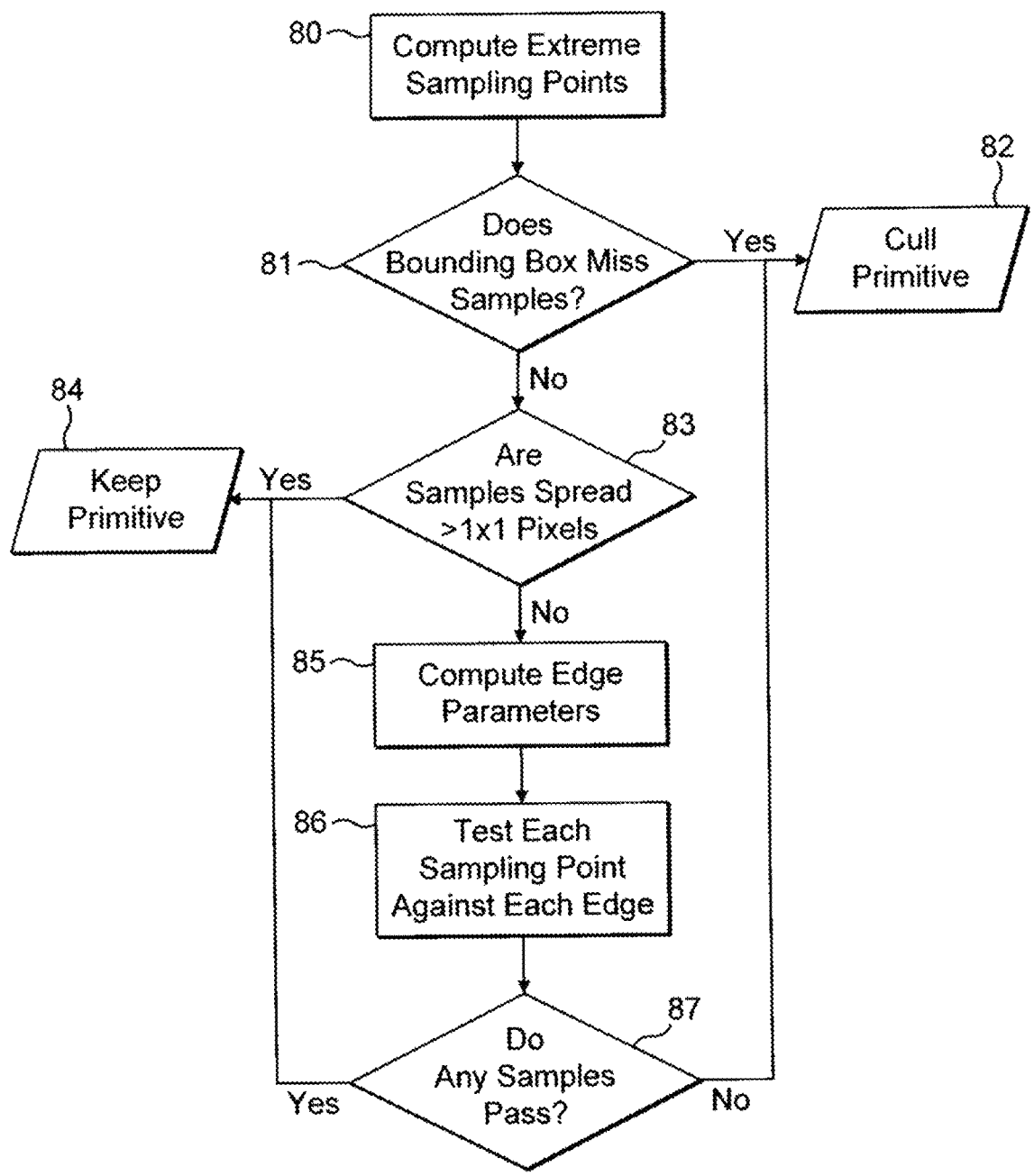
FIG. 9 is a flow diagram of a method of assessing a primitive and parts of the method may be used in the methods of FIGS. 7 and 10.
Figure 10:
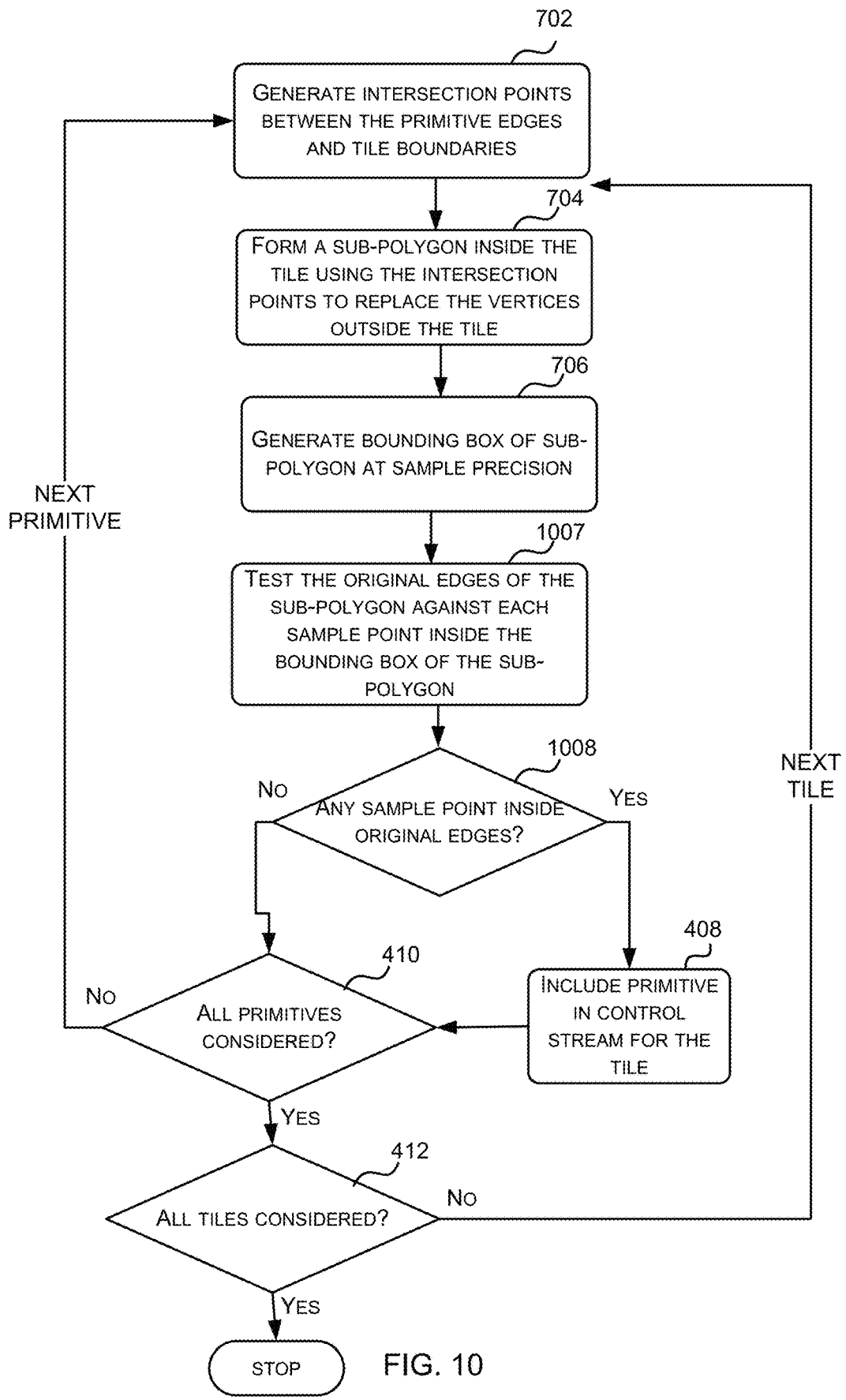
FIG. 10 is a flow diagram of a third example method of generating control streams for tiles in a tiling unit of a GPU.

The determination (in block 708) of whether the bounding box of the sub-polygon overlaps any of the samples may be performed using part of a method described in GB Patent No. 2401522 and shown in FIG. 9 (which corresponds to FIG. 10 in GB2401522). Four pixel sampling locations in the tile $\{S_{00}, S_{01}, S_{10}, S_{11}\}$ are first identified (block 80) using the bounding box of the sub-polygon 804 as follows:

$$s_{x\,min}=\lceil p_{x\,min}\rceil$$

$$s_{x\,max}=\lfloor p_{x\,max}\rfloor$$

$$s_{y\,min}=\lceil p_{y\,min}\rceil$$

$$s_{y\,max}=\lfloor p_{y\,max}\rfloor$$

$$S_{00}=(s_{x\,min},s_{y\,min})$$

$$S_{01}=(s_{x\,max},s_{y\,min})$$

$$S_{10}=(s_{x\,min},s_{y\,max})$$

$$S_{11}=(s_{x\,max},s_{y\,max})$$

where $\lfloor x \rfloor$ and $\lceil x \rceil$ are the standard 'floor' and 'ceiling' operators.

It can then be determined if the bounding box of the sub-polygon 804 misses all sample locations in the tile, e.g. all sample locations in tile A (block 81) and if it does ('Yes' in block 81, which corresponds to a 'No' in block 708 of FIG. 7) then the ID for the primitive 802 is not included in the control stream for the tile (i.e. the primitive is culled, using the terminology shown in FIG. 9) and the method of FIG. 9 does not proceed further in relation to the particular primitive and the particular tile (although the method may be repeated in a subsequent iteration of the method of FIG. 7 for the same primitive but a different tile, e.g. tile B). It can be determined if the bounding box of the sub-polygon misses all four sampling locations in the tile (in block 81) using the test:

IF ($s_{x\ min} > s_{x\ max}$ OR $s_{y\ min} > s_{y\ max}$) THEN MISSES

If the bounding box of the sub-polygon 804 does not miss all sample locations in the tile, e.g. in tile A ('No' in block 81 which corresponds to a 'Yes' in block 708 of FIG. 7) then the ID for the primitive 802 is included in the control stream for the tile (block 408, with the rest of the method blocks in FIG. 9 not being used), or is further tested with the third method as described below with reference to FIGS. 9-11.

As shown in FIG. 7, the method may iterate through each primitive in a set of candidate primitives (which may comprise all primitives or alternatively, the set may be a proper subset of a set comprising all primitives and may, for example, be generated using the first method as described above with reference to FIGS. 4-6) to generate a control stream for a tile and then once all primitives in the set have been considered for a particular tile ('Yes' in block 410), the method may be repeated until a control stream has been generated for every tile ('Yes' in block 412). It will be appreciated, however, that aspects of the method may be performed in parallel (e.g. some or all of the tiles may be considered in parallel) and the set of candidate primitives may be the same for all tiles (e.g. where the candidate set comprises all primitives) or may be different for different tiles (e.g. where the candidate set is generated using the first method described above with reference to FIGS. 4-6) or groups of tiles. The method could alternatively iterate through each tile to add a primitive to each tile control stream where needed and then once all the tiles have been considered for a particular primitive the method may be repeated until all the primitives have been considered.

Using the method shown in FIG. 7, the primitive 802 is not added to the control stream for tile A. This is in contrast to known methods which would add the ID of the primitive to the control stream for tile A even though the bounding box of the primitive does not cover any sample point in the tile (e.g. because the bounding box for the whole primitive 802 covers four of the sample positions in tile A).

In the method shown in FIG. 7 and described above, the intersection points are generated between the primitive edges and the tile boundaries (in block 702). In a variation of this method, the intersection points may instead be generated between the primitive edges and the bounding box of the tile at sample precision (e.g. as generated in block 402 of FIG. 4). This results in a smaller sub-polygon (as generated in block 704) and a smaller bounding box of the sub-polygon (as generated in block 706); however, otherwise the method proceeds as described above. The method may be implemented in a tiling unit of a GPU.

A third method of determining whether a primitive should be associated with a tile (e.g. whether a primitive ID should be added to a control stream for a tile) can be described with reference to FIGS. 9-11. This method requires additional processing compared to the methods described above with reference to FIGS. 4-6 and FIGS. 7-9, but results in additional non-contributing primitives not being added to the control stream. As described below, this method may be implemented in combination with either or both of the methods described above.

As shown in the flow diagram of FIG. 10, the intersection points between the edges of a primitive (e.g. a triangle) and tile boundaries are generated (block 702). Referring to the primitive 1102 (with vertices V0, V1, V2) shown in FIG. 11, these intersection points are Va and Vb. Line equations of the edges of the primitive (e.g. the triangle) may be used to generate the intersection points between triangle edges and tile boundaries (in block 702). These intersection points may be generated (in block 702) using the method described above with reference to FIG. 8. As noted above, although the method is described with reference to primitives which are triangles, the method may also be used for other primitive types (e.g. quads and lines).

Once the intersection points have been generated (in block 702), a sub-polygon is then formed inside the tile using the intersection points to replace the vertices outside the tile (block 704). Referring again to the example shown in FIG. 11, intersection point Va replaces vertex V1 and intersection point Vb replaces vertex V2 as both V1 and V2 are outside Tile A. A bounding box 1104 for the sub-polygon (with vertices V0, Va, Vb) is generated at sample precision (block 706).

Each of the sample points inside the bounding box of the sub-polygon 1104 is then tested against the original edges of the sub-polygon (where an original edge is an edge of the sub-polygon which is also at least part of an edge of the primitive from which the sub-polygon was formed) to see if there are any sample points inside the sub-polygon (block 1007). The new edge (between vertices Va and Vb in the example shown in FIG. 11) does not need to be tested because this edge lies on the boundary of tile A so all sample positions within tile A will be within this new edge of the sub-primitive. Only if there is a sample point inside the sub-polygon ('Yes' in block 1008), is the ID for the primitive 1102 is included in the control stream for the tile (block 408). If there are no sample points inside the sub-polygon ('No' in block 1008), then the ID is not included in the control stream for the tile.

The testing of original edges against the sample positions in the bounding block 1104 (in block 1007) may be performed using another part of the method described in GB Patent No. 2401522 and shown in FIG. 9; however, unlike in the description of GB 2401522, in the method of FIG. 10, the edges checked are the original edges of sub-polygon instead of all the edges from the triangle as in GB Patent No. 2401522.

The edge parameters for each of the original edges of the sub-polygon are computed (block 85) and then each sampling point within the bounding box of the sub-polygon 1104 is tested against each edge (block 86) and if any of the samples pass ('Yes in block 87, which corresponds to 'Yes' in block 1008) i.e. such that any of the samples are inside the sub-polygon, then the ID of the primitive 1102 is added to the control stream for the tile (in block 408).

The edge parameters for an edge i are denoted $A_i$, $B_i$, $C_i$, and depend upon the end points of the edge (i.e. the edge equation is $A_i x + B_i y + C_i = 0$). If these end points are denoted $(x_i, y_i)$ and $(x_{i+1}, y_{i+1})$ then:

$$A_i = y_i - y_{i+1}$$

$$B_i = x_{i+1} - x_i$$

$$C_i = x_i y_{i+1} - x_{i+1} y_i$$

and the four test inequalities for an edge and for the four distinct sampling locations $S_{x\,min}$, $S_{x\,max}$, $S_{y\,min}$, $S_{y\,max}$ (as defined above) are:

$$A_iS_{x\,min}+B_iS_{y\,min}+C_i \geq 0$$

$$A_iS_{x\,max}+B_iS_{y\,min}+C_i \geq 0$$

$$\Leftrightarrow A_i(S_{x\,min}+1)+B_iS_{y\,min}+C_i \geq 0$$

$$\Leftrightarrow A_iS_{x\,min}+B_iS_{y\,min}+C_i \geq -A_i$$

$$A_iS_{x\,min}+B_iS_{y\,max}C_i \geq 0$$

$$\Leftrightarrow A_iS_{x\,min}+B_iS_{y\,min}+C_i \geq -B_i$$

$$A_iS_{x\,max}+B_iS_{y\,max}+C_i \geq 0$$

$$\Leftrightarrow A_iS_{x\,min}+B_iS_{y\,min}+C_i \geq -B_i-A_i$$

The edge parameters which are computed (in block 85) relate only to the original edges of the sub-polygon and not to the newly added edge (e.g. between Va and Vb) which corresponds to the edge of the tile. When calculating the edge parameters (in block 85), the entire edges of the primitive may be used (i.e. between the original vertices of the primitive, e.g. for one edge between V0 and V1 and a second edge between V2 and V0 in the example shown in FIG. 11) or the edges of the sub-polygon may be used (e.g. for one edge between V0 and Va and a second edge between Vb and V0 in the example shown in FIG. 11).

By re-using parts of the method described in GB2401522 as described above, existing hardware within a tiling unit can be re-used. This reduces the amount of additional hardware that is required to implement the methods described herein and thereby reduces the size and power consumption of the hardware that implements the methods described herein.

The testing sample positions against edge equations (in block 86 of FIG. 9 which along with block 85 corresponds to block 1007 of FIG. 10) is done in reduced precision corresponding to 16.8 fixed point format of X and Y coordinates, rather than at full precision floating point as in rasterization process, to simplify and speed up the calculations in hardware. As the reduced precision is used in the method, errors may be introduced in the calculation. The reduced precision is safe when the triangle is relatively small therefore the accumulated errors in the iteration from the triangle vertices are limited, as the method in GB2401522 is designed for testing small triangles within a few pixels across. The error that is introduced is proportionally larger for larger primitives than for smaller primitives due to the accumulated effect in the calculation of interpolation between vertices of the triangle. Consequently for smaller primitives, the original vertices may be used to compute the edge parameters (in block 85) and for larger primitives, the intersection points (as generated in block 702) may be used instead. The decision as to which vertices to use (i.e. the original ones or the intersection points) may be made for the whole primitive (e.g. based on whether the primitive covers less than a predefined number of tiles, such as less than 4×4 tiles) or may be made on an edge by edge basis (e.g. based on whether the length of the edge exceeds a predefined threshold value or not).

As shown in FIG. 10, the method may iterate through each primitive in a set of candidate primitives to generate a control stream for a tile and then once all primitives in the set have been considered for a particular tile ('Yes' in block 410), the method may be repeated until a control stream has been generated for every tile ('Yes' in block 412). It will be appreciated, however, that aspects of the method may be performed in parallel (e.g. some or all of the tiles may be considered in parallel). The method could alternatively iterate through each tile to add a primitive to each tile control streams where needed and then once all the tiles have been considered for a particular primitive the method may be repeated until all the primitives have been considered.

The candidate set of primitives may comprise all primitives or alternatively, the set may be a proper subset of a set comprising all primitives and may, for example, be generated using the first method as described above with reference to FIGS. 4-6 and/or the second method as described above with reference to FIGS. 7-9. The set of candidate primitives may be the same for all tiles (e.g. where the candidate set comprises all primitives) or may be different for different tiles (e.g. where the candidate set is generated using the first method described above with reference to FIGS. 4-6 and/or the second method as described above with reference to FIGS. 7-9) or groups of tiles.

Using the method shown in FIG. 10, the primitive 1102 is not added to the control stream for tile A. This is in contrast to known methods which would add the ID of the primitive to the control stream for tile A.

In the method shown in FIG. 10 and described above, the intersection points are generated between the primitive edges and the tile boundaries (in block 702). In a variation of this method, the intersection points may instead be generated between the primitive edges and the bounding box of the tile at sample precision (e.g. as generated in block 402 of FIG. 4). This results in a smaller sub-polygon (as generated in block 704) and a smaller bounding box of the sub-polygon (as generated in block 706) which may result in fewer sample points to test against the original edges (in block 1007); however, otherwise the method proceeds as described above.

In the description of the methods of FIGS. 7 and 10 above, it is assumed that the arrangement of sample points in each pixel is the same (as noted above, there may be one or more sample points in each pixel). If the arrangement of sample points is not the same in each pixel, the methods of FIGS. 7 and 10 are not affected and can be implemented as described above unless a sample precision bounding box for the tile is used to generate the intersection points instead of the actual tile boundaries (in block 702). In this case the worst case sample positions may be used to generate the sample precision bounding box (e.g. as described above with reference to FIG. 6).

Figure 11:
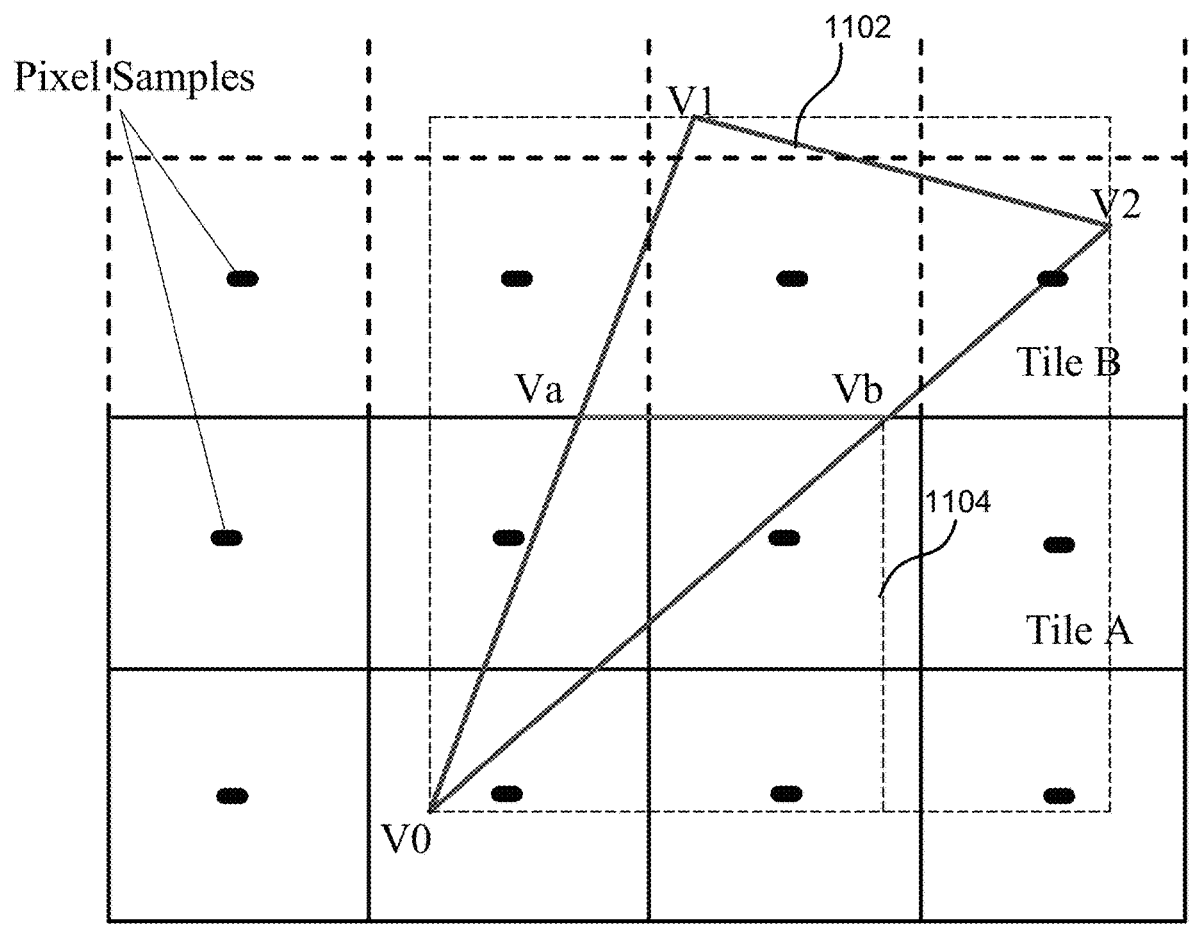
FIG. 11 is a schematic diagram showing an example primitive and its position with reference to one or more tiles.

In the examples shown in FIGS. 8 and 11, there is a single vertex, V0, in tile A and two intersection points (Va and Vb) on the same tile boundary. Examples where there is a single vertex in tile A and either two intersection points on different tile boundaries or more than two intersection points are described below with reference to FIG. 16.

Figure 12:
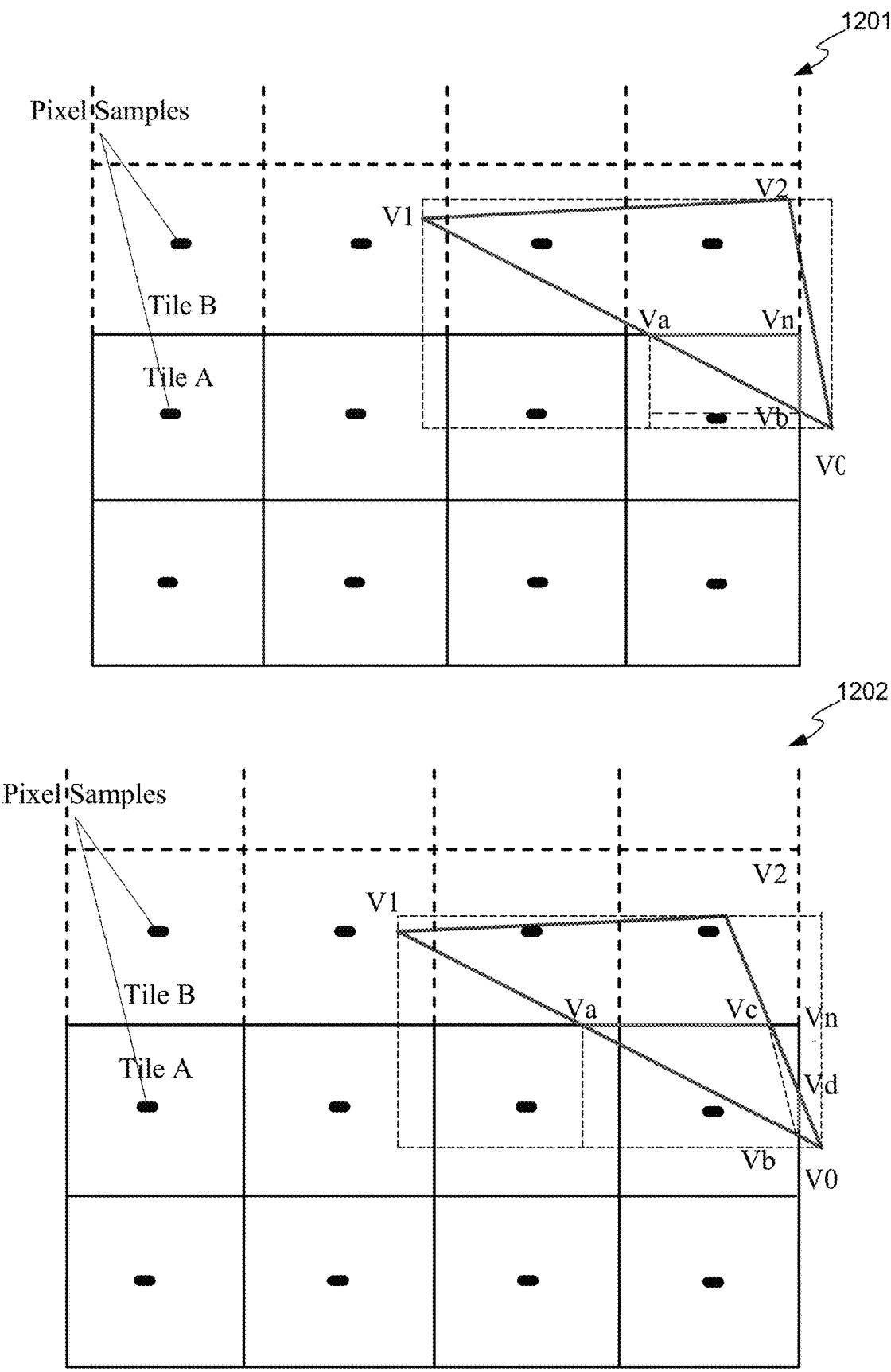
FIG. 12 is a schematic diagram showing example primitives and their position with reference to one or more tiles.
Figure 13:
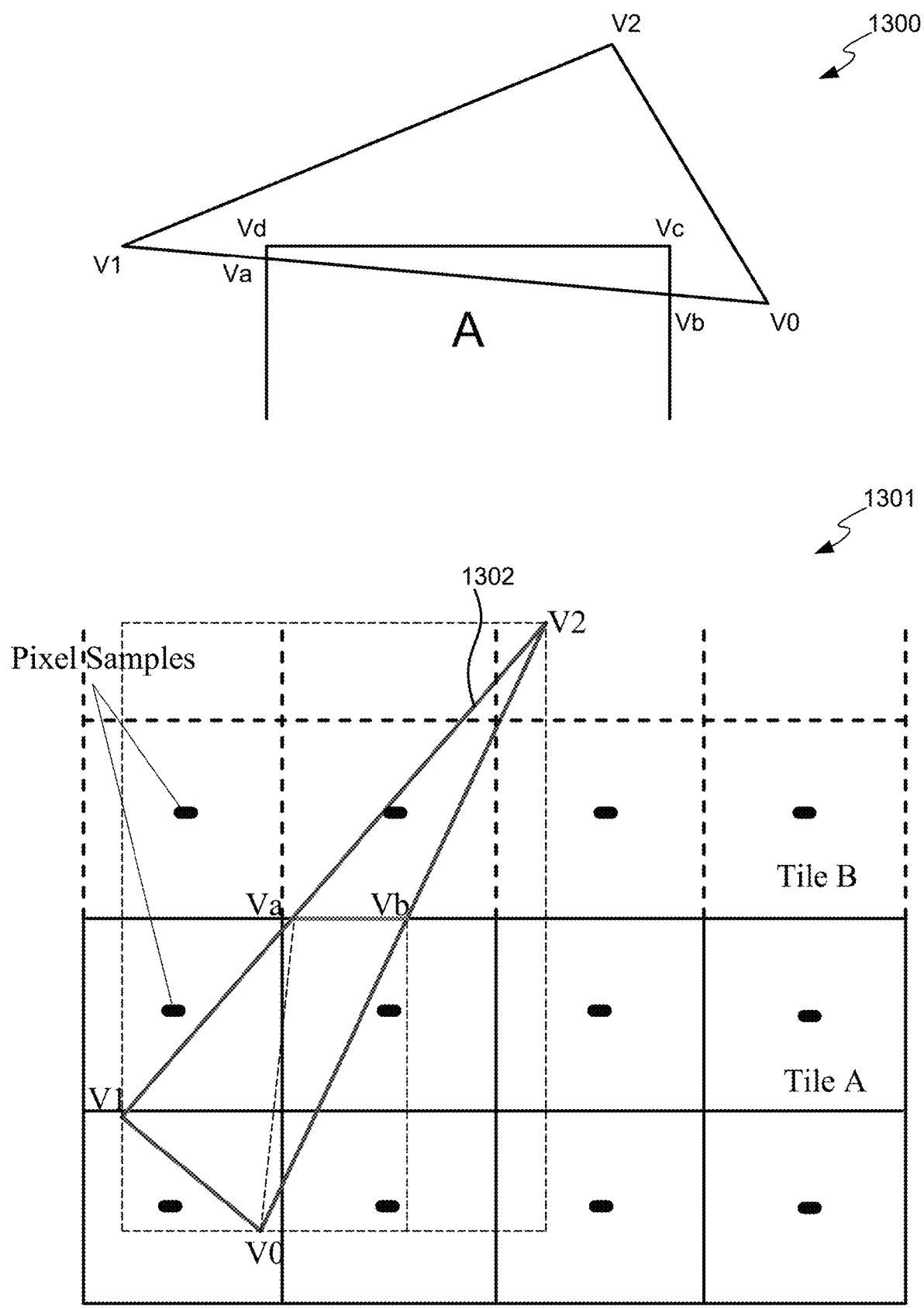
FIG. 13 is a schematic diagram showing example primitives and their position with reference to one or more tiles.

In other examples, however, there may be no vertices within the tile, as shown in the two examples 1201, 1202 in FIG. 12 and the first example 1300 in FIG. 13. In the first example 1201, there are two points of intersection, Va and Vb and these are on tile boundaries that intersect at a corner of the tile Vn. This results in a triangular sub-polygon with vertices Va, Vn and Vb being created (in block 704) and the method can then proceed as shown in either or both of FIGS. 7 and 10 and described above.

Figure 14:
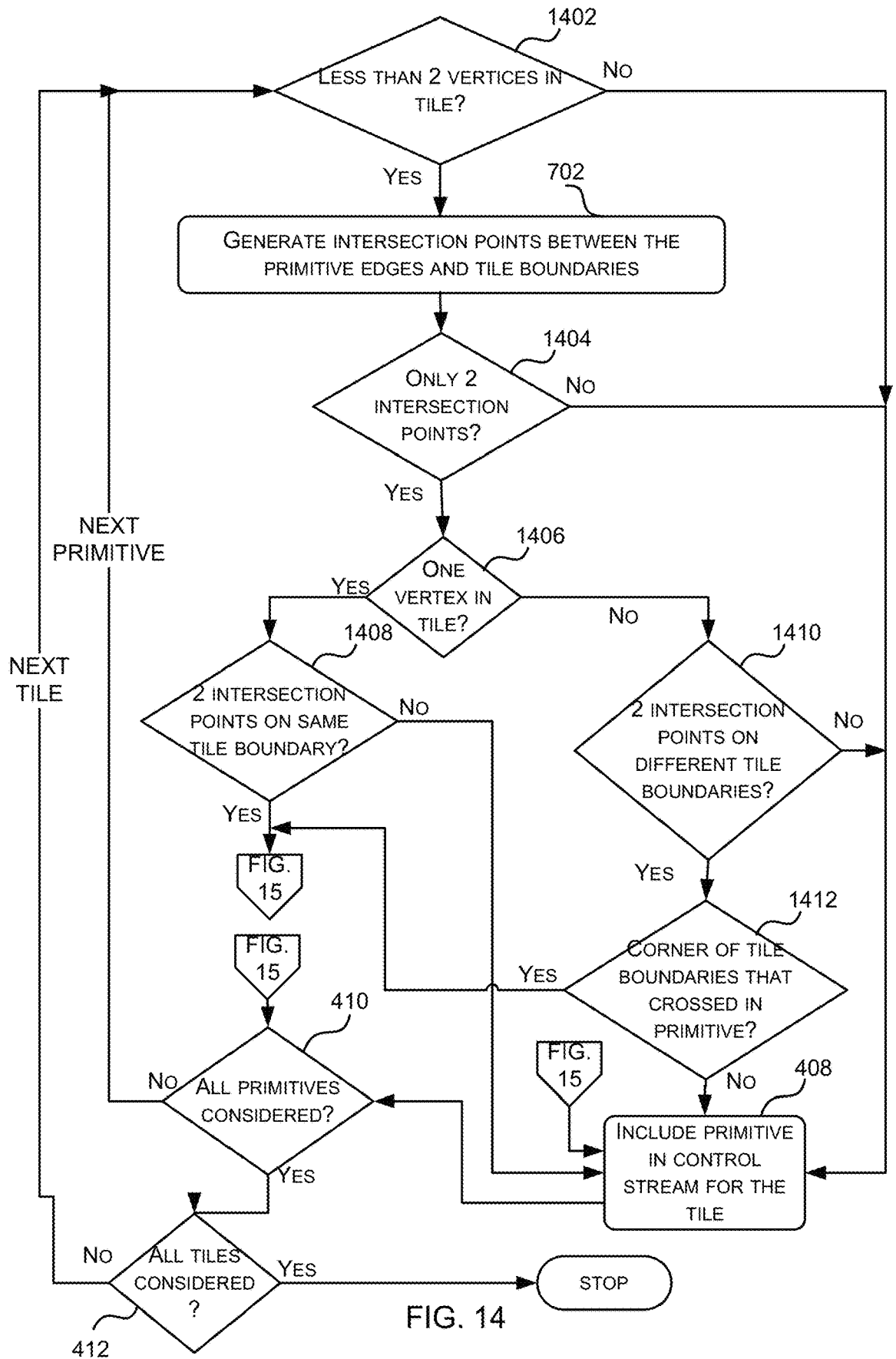
FIG. 14 is a flow diagram of part of a fourth example method of generating control streams for tiles in a tiling unit of a GPU.
Figure 15:
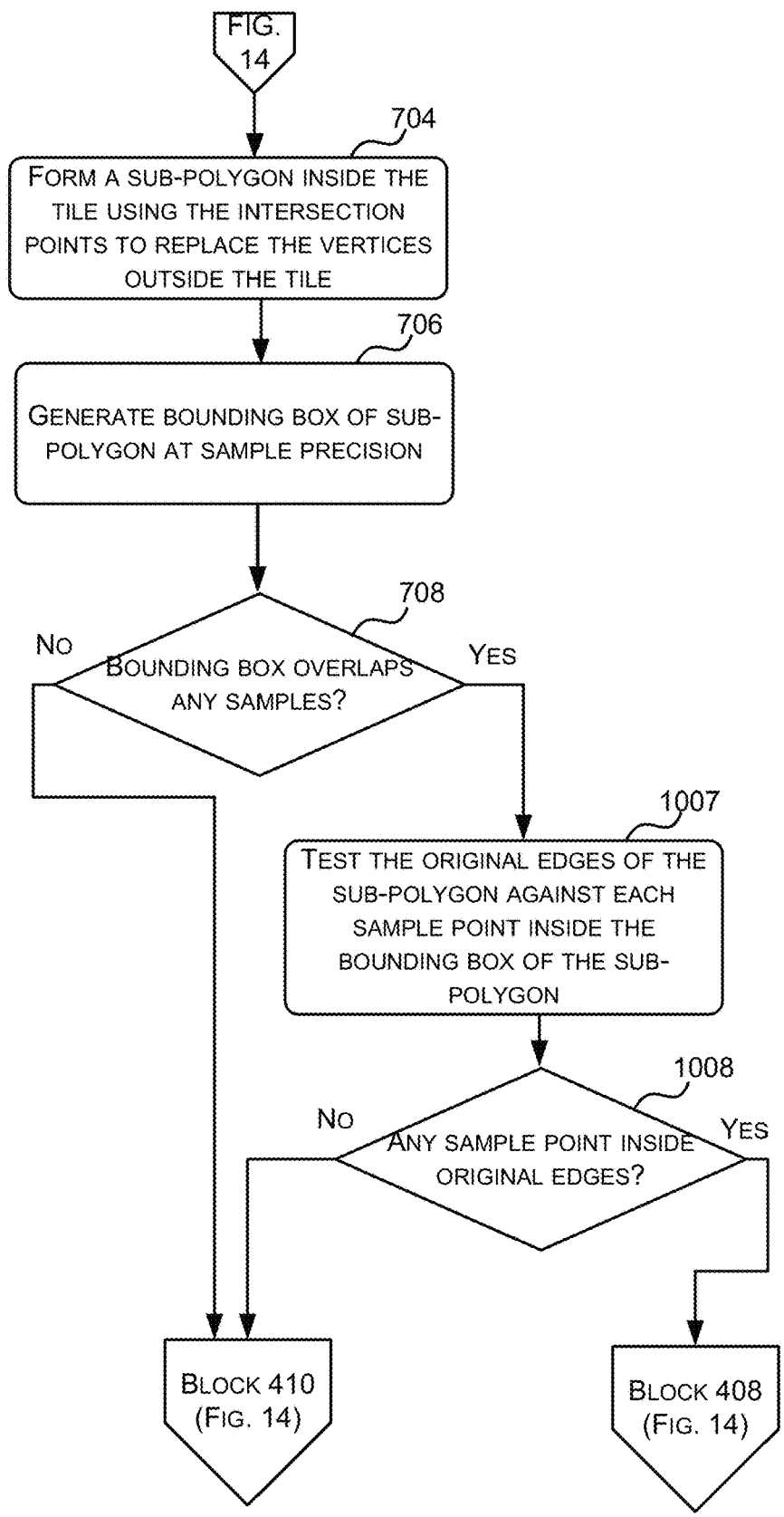
FIG. 15 is a flow diagram of part of a fourth example method of generating control streams for tiles in a tiling unit of a GPU.

In the second example 1202 in FIG. 12, there are four points of intersection, Va, Vb, Vc and Vd and these are on tile boundaries that intersect at a corner of the tile Vn and the sub-polygon is a quadrilateral instead of a triangle. In various examples, where the sub-polygon is a quadrilateral (or in general has more than 3 edges), the ID of the primitive may be added to the control stream for the tile without further consideration (e.g. as shown in FIGS. 14 and 15 and described below). Alternatively, the sub-polygon having more than three edges may be divided into two or more triangles (e.g. Va, Vc, Vb and Vc, Vd, Vb) and each of these triangles may be fed as sub-polygons into the methods of either or both of FIGS. 7 and 10. The sub-polygons which are part of the same primitive may be flagged such that it is clear that they are part of the same primitive and the primitive ID is included in the control stream (or the primitive is otherwise associated with the tile) if any samples are inside any of the two or more sub-polygons formed from the primitive.

As shown in the first example 1300 in FIG. 13, it is possible for there to be no vertices within the tile and two points of intersection, Va and Vb, which lie on opposite boundaries of the tile. In such examples, the ID of the primitive may be added to the control stream for the tile or alternatively, the sub-polygon within the tile (e.g. Va, Vb, Vc, Vd) may be divided into two or more triangles (e.g. Va, Vc, Vb and Va, Vd, Vb) and each of these triangles may be fed as sub-polygons into the methods of either or both of FIGS. 7 and 10. The sub-polygons which are part of the same primitive may be flagged such that it is clear that they are part of the same primitive, the primitive ID is included in the control stream if any samples are inside any of the two or more sub-polygons formed from the primitive.

In the second example 1301 shown in FIG. 13, there are two vertices, V0 and V1, in tile A. When the primitive is truncated (in blocks 702 and 704) this also results in a sub-polygon which is a quadrilateral with vertices V0, V1, Va and Vb. In various examples, where the sub-polygon is a quadrilateral, the ID of the primitive may be added to the control stream for the tile without further consideration. Alternatively, the quadrilateral sub-polygon may then be divided into two triangles (e.g. V0, V1, Va and V0, Va, Vb) and both of these triangles may be fed as sub-polygons into the methods of either or both of FIGS. 7 and 10. As described above, the two sub-polygons which are part of the same primitive may be flagged such that it is clear that they are part of the same primitive, the primitive ID is included in the control stream if any samples are inside any of the two sub-polygons. Using the method shown in FIG. 10 for each of the two triangles (Va,Vb,V0) and (Va,V0,V1) formed from the sub-polygon (Va,Vb,V0,V1), the primitive 1302 is not added to the control stream for tile A, even though the bounding box of each of the sub-polygon triangles covers two sample points in tile A. Instead, it can be decided using the method shown in FIG. 10 that the two sample points in the bounding box of the sub-polygon triangles are all located outside the sub-polygon (i.e. outside both of the triangles formed from the quadrilateral sub-polygon). This is in contrast to known methods which would add the ID of the primitive 1302 to the control stream for tile A.

FIGS. 14 and 15 show a flow diagram of an example method which combines the methods of FIGS. 7 and 10 along with a test relating to the number of vertices in a tile, as described above with reference to FIGS. 12 and 13. In this method, if any primitive has two or more vertices in the tile (No in block 1402) e.g. as shown in example 1301 in FIG. 13, then the ID of the primitive is added to the control stream for the tile (block 408) without further consideration. As described above, however, such primitives may alternatively be handled by dividing the sub-polygon (which may be a quadrilateral) into multiple triangles and then feeding the multiple triangles (as separate, but related sub-polygons) into the method of FIG. 15 (e.g. by starting at block 706 for each of the triangles).

If the primitive has less than two vertices in the tile ('Yes' in block 1402, i.e. one vertex in the tile or no vertices in the tile), the intersection points between the primitive edges and the tile boundaries are generated (block 702), as described above. In this method, if there are more than two intersection points ('No' in block 1404), then the ID of the primitive is added to the control stream for the tile (block 408) without further consideration, e.g. for example 1202 in FIG. 12, which has no vertices in the tile and more than two intersection points, the ID of the primitive is added to the control stream for the tile (block 408) without further consideration. As described above, however, such primitives may alternatively be handled by dividing the sub-polygon (which may be a quadrilateral) into multiple triangles and then feeding the multiple triangles (as separate, but related sub-polygons) into the method of FIG. 15 (e.g. by starting at block 706 for each of the triangles).

If the primitive has only two intersection points ('Yes' in block 1404), the method then divides depending upon whether there is only one vertex in the tile ('Yes' in block 1406 then 1408) or no vertex in the tile ('No' in block 1406 then 1410).

As shown in FIG. 14, the ID of the primitive is added to the control stream (in block 408) if there is only one vertex in the tile ('Yes' in block 1406) but the two intersection points are not on the same boundary ('No' in block 1408) or if there is no vertex in the tile ('No' in block 1406) but the two intersection points are not on different tile boundaries ('No' in block 1410). Additionally, the ID of the primitive is then added to the control stream (in block 408) if there is no vertex in the tile ('No' in block 1406), the two intersection points are on different tile boundaries ('Yes' in block 1410) but those two different boundaries do not meet at a corner within the primitive ('No' in block 1412). As described above, however, such primitives may alternatively be handled by dividing the sub-polygon (which may be a quadrilateral) into multiple triangles and then feeding the multiple triangles (as separate, but related sub-polygons) into the method of FIG. 15 (e.g. by starting at block 706 for each of the triangles).

If the ID of the primitive has not yet been added to the control stream, the method proceeds onto FIG. 15 which shows a concatenation of the tests from FIGS. 7 and 10. As described above with reference to FIG. 7, a sub-polygon is formed inside the tile using the intersection points to replace the vertices outside the tile (block 704) and then a bounding box of the sub-polygon is generated at sample precision (block 706). If the bounding box overlaps any samples ('Yes' in block 708), the method proceeds to the tests described above with reference to FIG. 10 and the original edges of the sub-polygon are tested against each sample point inside the bounding box of the sub-polygon (block 1007). If there is any sample point inside the original edges ('Yes' in block 1008), the ID of the primitive is added to the control stream for the tile (block 408). If, however, the bounding box does not overlap any samples ('No' in block 708) or there are no sample points inside the original edges ('No' in block 1008), then the primitive ID is not added to the control stream.

As shown in FIG. 14, the method may iterate through each primitive to generate a control stream for a tile and then once all primitives have been considered for a particular tile ('Yes' in block 410), the method may be repeated until a control stream has been generated for every tile ('Yes' in block 412). It will be appreciated, however, that aspects of the method may be performed in parallel (e.g. some or all of the tiles may be considered in parallel). The method may alternatively iterate through each tile to add a primitive to each covered tile's tile control stream, and once all the tiles have been considered for a particular primitive, the method may be repeated until all the primitives have been considered.

Figure 16:
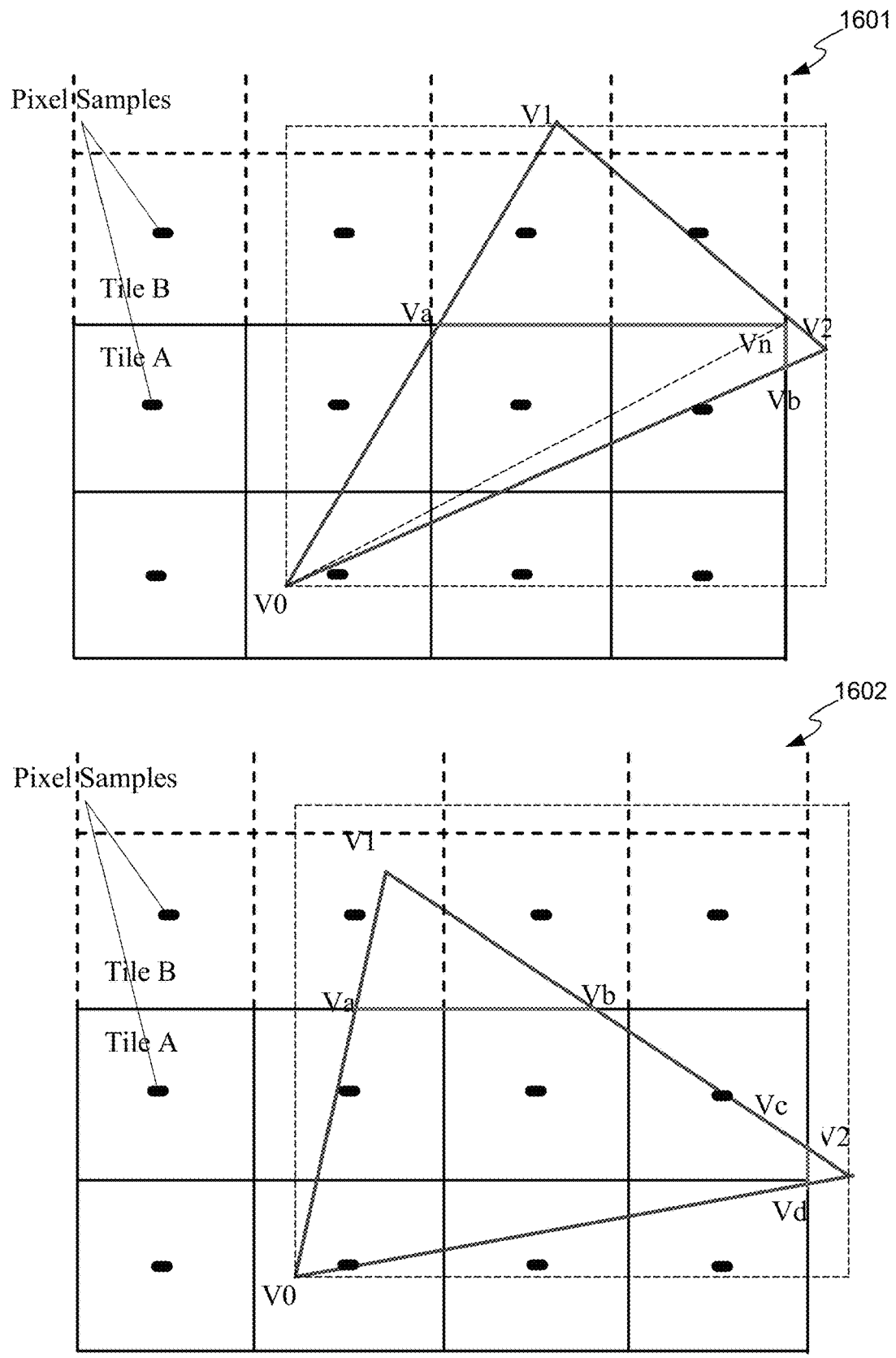
FIG. 16 is a schematic diagram showing example primitives and their position with reference to one or more tiles.

FIG. 16 shows two further examples 1601, 1602 of primitives which cannot be eliminated from the control stream of tile A using the method of FIGS. 14 and 15. In the first example 1601, the primitive has a single vertex in tile A, V0 ('Yes' in block 1402) and only two intersection points, Va and Vb ('Yes' in block 1404). However, the intersection points are not on the same tile boundary ('Yes' in block 1406 followed by 'No' in block 1408) and so the primitive is included in the control stream (in block 408). In the second example 1602, the primitive has a single vertex in tile A, V0 ('Yes' in block 1402) and four intersection points, Va, Vb, Vc and Vd ('No' in block 1404) and so the primitive is included in the control stream (in block 408).

As described above, the sub-polygons in examples 1601, 1602 may alternatively each be divided into multiple triangles and these may all be fed into the methods described herein as separate (but linked) primitives.

FIG. 17 shows a flow diagram of an example method which combines all the methods described above. The method described above with reference to FIG. 4 is applied first (block 1702 with block 1704 corresponding to the test in block 406 of FIG. 4). If the primitive is not eliminated by this assessment (in block 1702), i.e. if it cannot be determined that the bounding boxes do not overlap ('No' in block 406 which corresponds to 'No' in block 1704), then the method proceeds with a further assessment of the primitive. In the method shown in FIG. 17, a technique referred to as 'perfect tiling' may optionally be used to eliminate some further primitives in the tile (block 1708). This technique is also described in GB2401522 (e.g. in FIG. 4 of that patent). Perfect tiling involves comparing the edge equations of a primitive with the integer tile boundaries to check if the corner of the tile is inside the primitive. In perfect tiling, there is no comparison of sample points and the assessment is performed at the corner of the tile boundaries. In the example shown in FIG. 17, perfect tiling is not performed ('No' in block 1706) if the bounding box of the primitive overlaps only one tile in the X and/or Y direction.

As part of the perfect tiling method (in block 1708) the edge equations of the primitive are calculated and these are then re-used in the subsequent assessment of the primitive (in block 1712). The primitive sample precision bounding box technique (block 1702 and FIG. 4) does not require calculation of the edge equations and so it is efficient to eliminate some primitives (in block 1704) prior performing perfect tiling (in block 1708) and/or the other methods described herein which do require calculation of the edge equations.

If the primitive is not eliminated by the perfect tiling assessment (in block 1708), where implemented, then the method proceeds with a further assessment of the primitive using the method shown in FIGS. 14 and 15 (block 1712 with block 1714 corresponding to the decision points in blocks 1402, 1404, 1408, 1410, 1412, 708 and 1008). As described above, this assessment involves the use of edge equations (in block 1007) and these edge equations may have already been calculated (in block 1708).

As shown in FIG. 17, the method may iterate through each primitive to generate a control stream for a tile (block 1718) and then once all primitives have been considered for a particular tile ('No' in block 1718), the method may be repeated until a control stream has been generated for every tile (not shown in FIG. 17). It will be appreciated, however, that aspects of the method may be performed in parallel (e.g. some or all of the tiles may be considered in parallel).

In the methods described above, any testing that is performed in relation to sampling points within a pixel only identifies whether any sample position is within the primitive/sub-primitive/bounding box. In many implementations, there is no determination of which sampling point falls within the primitive/sub-primitive/bounding box. As also described above, each pixel may comprise a single sampling point or may comprise a plurality of sampling points and the analysis is performed at the reduced sample precision (e.g. 16.8 format).

In the examples shown in the accompanying drawings, each primitive covers at least one sample position within the rendering space, although in the case of non-contributing primitives for a tile, the primitive may not cover a sample position within the particular tile being considered (e.g. in FIG. 8, the primitive 802 does not cover any sample positions in tile A but does cover two sample positions in tile B). However, the methods described herein may, in various examples, be used for primitives that do not necessarily cover any sample positions in any tile within the rendering space.

As described above, the methods described herein may be implemented in an improved tiling unit in a GPU (e.g. as shown in FIG. 1). The methods may be implemented in software and/or hardware and as described above, in various examples, existing hardware may be re-used to perform elements of the methods described herein.

By using the methods described herein, the number of primitives (and in particular the number of non-contributing primitives) that are added to the control stream for a tile is reduced. This reduces the effect used in subsequent operations within the rendering unit and so improves the efficiency of the overall graphics processing system. As primitive sizes become smaller, the efficiency savings that can be achieved using the methods described herein is expected to become larger.

The methods described herein are performed before rasterization (which is performed within the rendering unit 110 in FIG. 1). By reducing the number of primitives in a control stream for a tile, rasterization is simplified. Unlike rasterization, the methods described herein only determine if any sample point is within a primitive and the methods are agnostic to which sample point is within the primitive (i.e. the methods described herein eliminate primitives before the per-sample analysis is performed). Rasterisation renders image values at the sample positions. In a tile-based graphics system, a rendering unit can perform rendering in a tile-by-tile manner using the control stream for a tile to identify primitives which are relevant to the rendering of the tile.

In most of the examples described above the primitives are associated with tiles by storing primitive IDs in control streams for the tiles. In other examples, associations between primitives and tiles may be stored differently, e.g. for each primitive a tile list could be stored which includes tile IDs of tiles in which the primitive is present.

A first further example provides a method of processing primitives within a tiling unit of a graphics processing system, the method comprising: determining whether a primitive falls within a tile based on positions of samples within pixels in the tile, said determining comprising: generating a bounding box of the tile at sample precision; and determining whether the primitive falls within the tile based on the generated bounding box of the tile; and in response to determining that a primitive does fall within a tile based on the positions of samples within pixels in the tile, storing an association between the tile and the primitive to indicate that the primitive is present in the tile.

The first further example may additionally include any combination of one or more of the following features:

Determining whether the primitive falls within the tile based on the generated bounding box of the tile may comprise: generating a bounding box of the primitive at sample precision; determining if the bounding boxes overlap; and in response to determining that the bounding boxes do not overlap, determining that the primitive does not fall within the tile.

Said storing an association between the tile and the primitive may comprise adding an identifier for the primitive to a control stream for the tile.

Said storing an association between the tile and the primitive may comprise adding an identifier for the tile to a tile list for the primitive.

The method may further comprise rendering primitives in a tile using the stored associations, wherein the rendering is performed at each sample position within the tile.

The determination may be performed at a reduced sample precision.

Determining whether a primitive falls within a tile based on positions of samples within pixels in a tile further may comprise: generating any intersection points between edges of the primitive and boundaries of the tile; forming a sub-polygon inside the tile by replacing vertices of the primitive outside the tile with the intersection points; generating a bounding box of the sub-polygon at sample precision; determining if the bounding box of the sub-polygon overlaps any samples in the tile; and in response to determining that the bounding box of the sub-polygon overlaps any samples in the tile, determining that the primitive falls within the tile.

Generating any intersection points between edges of the primitive and boundaries of the tile may comprise: generating any intersection points between edges of the primitive and edges of the bounding box of the tile at sample precision.

Forming a sub-polygon inside the tile by replacing vertices of the primitive outside the tile with the intersection points may comprise: forming an initial sub-polygon inside the tile by replacing vertices of the primitive outside the tile with the intersection points; and if the initial sub-polygon has more than three vertices, dividing the initial sub-polygon into a plurality of smaller sub-polygons, each having only three vertices, and wherein a bounding box is generated at sample precision for each smaller sub-polygon and it is determined, for each generated bounding box, if it overlaps any samples in the tile.

Determining if the bounding box of the sub-polygon overlaps any samples in the tile may comprise: identifying four sampling locations in the tile using the bounding box of the sub-polygon; and determining whether the bounding box of the sub-polygon misses all four sampling locations in the tile.

Determining whether a primitive falls within a tile based on positions of samples within pixels in a tile may further comprise: generating any intersection points between edges of the primitive and boundaries of the tile; forming a sub-polygon inside the tile by replacing vertices of the primitive outside the tile with the intersection points; generating a bounding box of the sub-polygon at sample precision; testing each edge of the sub-polygon which is also part of an edge of the primitive against each sample point in the bounding box of the sub-polygon to determine if any sample point is inside the sub-polygon; and in response to determining that any sample point is inside the sub-polygon, determining that the primitive falls within the tile.

Generating any intersection points between edges of the primitive and boundaries of the tile may comprise: generating any intersection points between edges of the primitive and edges of the bounding box of the tile at sample precision.

Forming a sub-polygon inside the tile by replacing vertices of the primitive outside the tile with the intersection points may comprise: forming an initial sub-polygon inside the tile by replacing vertices of the primitive outside the tile with the intersection points; and if the initial sub-polygon has more than three vertices, dividing the initial sub-polygon into a plurality of smaller sub-polygons, each having only three vertices, and wherein a bounding box is generated at sample precision for each smaller sub-polygon and wherein testing each edge of the sub-polygon which is also part of an edge of the primitive against each sample point in the bounding box of the sub-polygon to determine if any sample point is inside the sub-polygon comprises: for each smaller sub-polygon, testing each edge of the smaller sub-polygon which is also part of an edge of the primitive against each sample point in the bounding box of the smaller sub-polygon to determine if any sample point is inside the smaller sub-polygon.

Testing each edge of the sub-polygon which is also part of an edge of the primitive against each sample point in the bounding box of the sub-polygon to determine if any sample point is inside the sub-polygon may comprise: computing edge parameters for each edge of the sub-polygon which is also part of an edge of the primitive; and testing each sample point in the bounding box of the sub-polygon against each edge.

Determining whether a primitive falls within a tile based on positions of samples within a pixel may further comprise: determining how many vertices of the primitive fall within the tile; in response to determining that two or more vertices fall within the tile, determining that the primitive falls within the tile; in response to determining that less than two vertices fall within the tile, generating any intersection points between edges of the primitive and boundaries of the tile; in response to generating more than two intersection points, determining that the primitive falls within the tile; in response to generating exactly two intersection points for a primitive with only one vertex in the tile and where the intersection points are on different boundaries of the tile, determining that the primitive falls within the tile; in response to generating exactly two intersection points for a primitive with no vertices in the tile and where the intersection points are on the same boundary of the tile or on different boundaries of the tile that do not cross within the primitive, determining that the primitive falls within the tile; and in response to generating exactly two intersection points for a primitive with only one vertex in the tile and where the intersection points are on same boundary of the tile and in response to generating exactly two intersection points for a primitive with no vertices in the tile and where the intersection points are on different boundaries of the tile which cross within the primitive: forming a sub-polygon inside the tile by replacing vertices of the primitive outside the tile with the intersection points; generating a bounding box of the sub-polygon at sample precision; determining if the bounding box of the sub-polygon overlaps any samples in the tile; in response to determining that the bounding box of the sub-polygon overlaps any samples in the tile, determining that the primitive falls within the tile; in response to determining that the bounding box of the sub-polygon does not overlap any samples in the tile, testing each edge of the sub-polygon which is also part of an edge of the primitive against each sample point in the bounding box of the sub-polygon to determine if any sample point is inside the sub-polygon; and in response to determining that any sample point is inside the sub-polygon, determining that the primitive falls within the tile.

A second further example provides a graphics processing system comprising a tiling unit for processing primitives for each of a plurality of tiles, the tiling unit being configured to: determine whether a primitive falls within a tile based on positions of samples within pixels in the tile by: generating a bounding box of the tile at sample precision; and determining whether the primitive falls within the tile based on the generated bounding box of the tile; and cause an association between the tile and the primitive to be stored to indicate that the primitive is present in the tile in response to determining that the primitive does fall within the tile based on the positions of samples within pixels in the tile.

The second further example may additionally include any combination of one or more of the following features:

The tiling unit may be configured to determine whether the primitive falls within the tile based on the generated bounding box of the tile by: generating a bounding box of the primitive at sample precision; determining if the bounding boxes overlap; and in response to determining that the bounding boxes do not overlap, determining that the primitive does not fall within the tile.

The tiling unit may be configured to store an association between the tile and the primitive by adding an identifier for the primitive to a control stream for the tile.

The tiling unit may be configured to store an association between the tile and the primitive by adding an identifier for the tile to a tile list for the primitive.

The graphics processing system may further comprise a rendering unit configured to render primitives in a tile using the stored associations, wherein the rendering is performed at each sample position within the tile.

The tiling unit may be configured to determine whether the primitive falls within the tile at a reduced sample precision.

The tiling unit may be further configured to determine whether a primitive falls within a tile based on positions of samples within pixels in a tile further by: generating any intersection points between edges of the primitive and boundaries of the tile; forming a sub-polygon inside the tile by replacing vertices of the primitive outside the tile with the intersection points; generating a bounding box of the sub-polygon at sample precision; determining if the bounding box of the sub-polygon overlaps any samples in the tile; and in response to determining that the bounding box of the sub-polygon overlaps any samples in the tile, determining that the primitive falls within the tile.

The tiling unit may be further configured to generate any intersection points between edges of the primitive and boundaries of the tile by: generating any intersection points between edges of the primitive and edges of the bounding box of the tile at sample precision.

The tiling unit may be further configured to form a sub-polygon inside the tile by replacing vertices of the primitive outside the tile with the intersection points by: forming an initial sub-polygon inside the tile by replacing vertices of the primitive outside the tile with the intersection points; and if the initial sub-polygon has more than three vertices, dividing the initial sub-polygon into a plurality of smaller sub-polygons, each having only three vertices, and wherein a bounding box is generated at sample precision for each smaller sub-polygon and it is determined, for each generated bounding box, if it overlaps any samples in the tile.

The tiling unit may be further configured to determine if the bounding box of the sub-polygon overlaps any samples in the tile by: identifying four sampling locations in the tile using the bounding box of the sub-polygon; and determining whether the bounding box of the sub-polygon misses all four sampling locations in the tile.

The tiling unit may be further configured to determine whether a primitive falls within a tile based on positions of samples within pixels in a tile further by: generating any intersection points between edges of the primitive and boundaries of the tile; forming a sub-polygon inside the tile by replacing vertices of the primitive outside the tile with the intersection points; generating a bounding box of the sub-polygon at sample precision; testing each edge of the sub-polygon which is also part of an edge of the primitive against each sample point in the bounding box of the sub-polygon to determine if any sample point is inside the sub-polygon; and in response to determining that any sample point is inside the sub-polygon, determining that the primitive falls within the tile.

The tiling unit may be further configured to generate any intersection points between edges of the primitive and boundaries of the tile by: generating any intersection points between edges of the primitive and edges of the bounding box of the tile at sample precision.

The tiling unit may be further configured to form a sub-polygon inside the tile by replacing vertices of the primitive outside the tile with the intersection points comprises: forming an initial sub-polygon inside the tile by replacing vertices of the primitive outside the tile with the intersection points; and if the initial sub-polygon has more than three vertices, dividing the initial sub-polygon into a plurality of smaller sub-polygons, each having only three vertices, and wherein a bounding box is generated at sample precision for each smaller sub-polygon and wherein testing each edge of the sub-polygon which is also part of an edge of the primitive against each sample point in the bounding box of the sub-polygon to determine if any sample point is inside the sub-polygon comprises: for each smaller sub-polygon, testing each edge of the smaller sub-polygon which is also part of an edge of the primitive against each sample point in the bounding box of the smaller sub-polygon to determine if any sample point is inside the smaller sub-polygon.

The tiling unit may be further configured to test each edge of the sub-polygon which is also part of an edge of the primitive against each sample point in the bounding box of the sub-polygon to determine if any sample point is inside the sub-polygon by: computing edge parameters for each edge of the sub-polygon which is also part of an edge of the primitive; and testing each sample point in the bounding box of the sub-polygon against each edge.

The tiling unit may be further configured to determine whether a primitive falls within a tile based on positions of samples within a pixel further by: determining how many vertices of the primitive fall within the tile; in response to determining that two or more vertices fall within the tile, determining that the primitive falls within the tile; in response to determining that less than two vertices fall within the tile, generating any intersection points between edges of the primitive and boundaries of the tile; in response to generating more than two intersection points, determining that the primitive falls within the tile; in response to generating exactly two intersection points for a primitive with only one vertex in the tile and where the intersection points are on different boundaries of the tile, determining that the primitive falls within the tile; in response to generating exactly two intersection points for a primitive with no vertices in the tile and where the intersection points are on the same boundary of the tile or on different boundaries of the tile that do not cross within the primitive, determining that the primitive falls within the tile; and in response to generating exactly two intersection points for a primitive with only one vertex in the tile and where the intersection points are on same boundary of the tile and in response to generating exactly two intersection points for a primitive with no vertices in the tile and where the intersection points are on different boundaries of the tile which cross within the primitive: forming a sub-polygon inside the tile by replacing vertices of the primitive outside the tile with the intersection points; generating a bounding box of the sub-polygon at sample precision; determining if the bounding box of the sub-polygon overlaps any samples in the tile; in response to determining that the bounding box of the sub-polygon overlaps any samples in the tile, determining that the primitive falls within the tile; in response to determining that the bounding box of the sub-polygon does not overlap any samples in the tile, testing each edge of the sub-polygon which is also part of an edge of the primitive against each sample point in the bounding box of the sub-polygon to determine if any sample point is inside the sub-polygon; and in response to determining that any sample point is inside the sub-polygon, determining that the primitive falls within the tile.

Figure 18:
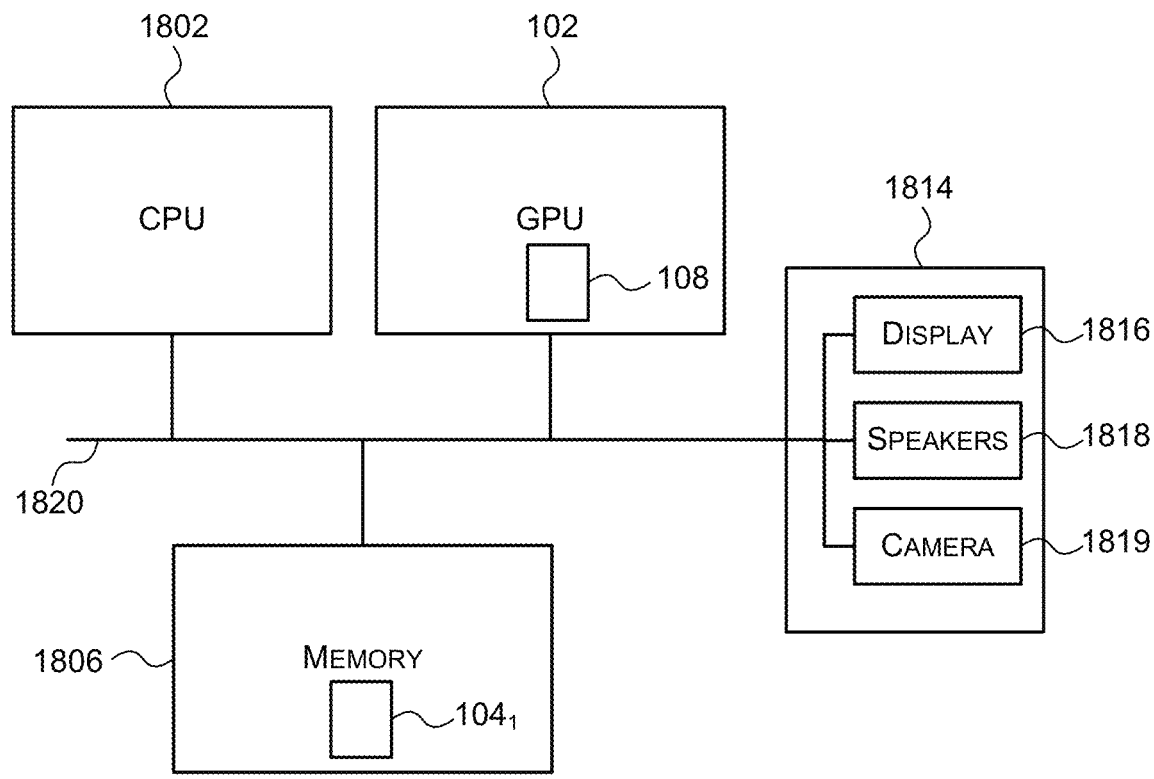
FIG. 18 shows a computer system in which a graphics processing system is implemented.

FIG. 18 shows a computer system in which the graphics processing systems and methods described herein may be implemented. The computer system comprises a CPU 1802, a GPU 102, a memory 1806 and other devices 1814, such as a display 1816, speakers 1818 and a camera 1819. A tiling unit 108 which implements one or more of the methods described herein is implemented on the GPU 102. In other examples, the tiling unit 108 may be implemented on the CPU 1802. The components of the computer system can communicate with each other via a communications bus 1820. A store 1041 is implemented as part of the memory 1806.

The graphics processing system 100 of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a functional block need not be physically generated by the functional block at any point and may merely represent logical values which conveniently describe the processing performed by the graphics processing system between its input and output.

The methods described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a GPU configured to perform any of the methods described herein, or to manufacture a GPU comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a GPU will now be described with respect to FIG. 19.

Figure 19:
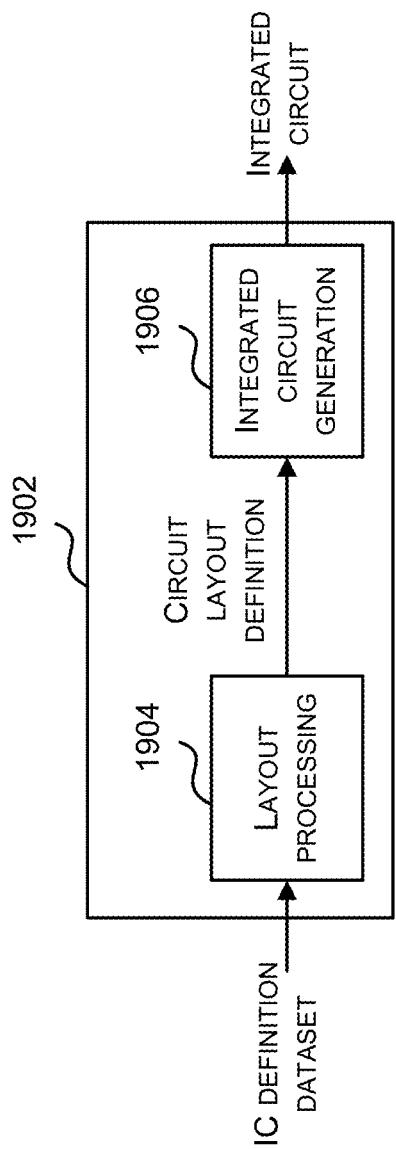
FIG. 19 shows an integrated circuit manufacturing system for generating an integrated circuit embodying a graphics processing system.

FIG. 19 shows an example of an integrated circuit (IC) manufacturing system 1902 which comprises a layout processing system 1904 and an integrated circuit generation system 1906. The IC manufacturing system 1902 is configured to receive an IC definition dataset (e.g. defining a GPU as described in any of the examples herein), process the IC definition dataset, and generate an IC according to the IC definition dataset (e.g. which embodies a GPU as described in any of the examples herein). The processing of the IC definition dataset configures the IC manufacturing system 1902 to manufacture an integrated circuit embodying a GPU as described in any of the examples herein.

The layout processing system 1904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1904 has determined the circuit layout it may output a circuit layout definition to the IC generation system 1906. A circuit layout definition may be, for example, a circuit layout description.

The IC generation system 1906 generates an IC according to the circuit layout definition, as is known in the art. For example, the IC generation system 1906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1906 may be in the form of computer-readable code which the IC generation system 1906 can use to form a suitable mask for use in generating an IC.

The different processes performed by the IC manufacturing system 1902 may be implemented all in one location, e.g. by one party. Alternatively, the IC manufacturing system 1902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 19 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 19, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media (which may be volatile or non-volatile) include disks, thumb drives, memory cards, semiconductor-based memory, optical/magnetic/phase change memory etc. and do not include propagated signals. The software can be suitable for execution on a parallel processor or a serial processor such that the method steps may be carried out in any suitable order, or simultaneously.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing primitives within a tiling unit of a graphics processing system, the method comprising:
    determining whether a primitive falls within a tile based on positions of samples within pixels in the tile, said determining comprising generating a bounding box of the tile at sample precision; and
    indicating that the primitive falls within the tile based on the generated bounding box of the tile.

2. The method according to claim 1, further comprising determining whether the primitive falls within the tile based on the generated bounding box of the tile.

3. The method according to claim 2, wherein determining whether the primitive falls within the tile based on the generated bounding box of the tile comprises:
    generating a bounding box of the primitive at sample precision;
    determining if the bounding boxes overlap; and
    in response to determining that the bounding boxes do not overlap, determining that the primitive does not fall within the tile.

4. The method according to claim 2, wherein determining whether the primitive falls within the tile based on the generated bounding box of the tile is performed at a reduced sample precision.

5. The method according to claim 2, wherein determining whether a primitive falls within a tile based on positions of samples within pixels in a tile further comprises:
    generating any intersection points between edges of the primitive and boundaries of the tile;
    forming a sub-polygon inside the tile by replacing vertices of the primitive outside the tile with the intersection points;
    generating a bounding box of the sub-polygon at sample precision;
    determining if the bounding box of the sub-polygon overlaps any samples in the tile; and
    in response to determining that the bounding box of the sub-polygon overlaps any samples in the tile, determining that the primitive falls within the tile.

6. The method according to claim 5, wherein generating any intersection points between edges of the primitive and boundaries of the tile comprises:
    generating any intersection points between edges of the primitive and edges of the bounding box of the tile at sample precision.

7. The method according to claim 5, wherein forming a sub-polygon inside the tile by replacing vertices of the primitive outside the tile with the intersection points comprises:
    forming an initial sub-polygon inside the tile by replacing vertices of the primitive outside the tile with the intersection points; and if the initial sub-polygon has more than three vertices, dividing the initial sub-polygon into a plurality of smaller sub-polygons, each having only three vertices, and wherein a bounding box is generated at sample precision for each smaller sub-polygon and it is determined, for each generated bounding box, if it overlaps any samples in the tile.

8. The method according to claim 2, wherein determining whether a primitive falls within a tile based on positions of samples within pixels in a tile further comprises:
generating any intersection points between edges of the primitive and boundaries of the tile;
forming a sub-polygon inside the tile by replacing vertices of the primitive outside the tile with the intersection points;
generating a bounding box of the sub-polygon at sample precision;
testing each edge of the sub-polygon which is also part of an edge of the primitive against each sample point in the bounding box of the sub-polygon to determine if any sample point is inside the sub-polygon; and
in response to determining that any sample point is inside the sub-polygon, determining that the primitive falls within the tile.

9. The method according to claim 8, wherein generating any intersection points between edges of the primitive and boundaries of the tile comprises:
generating any intersection points between edges of the primitive and edges of the bounding box of the tile at sample precision.

10. The method according to claim 8, wherein forming a sub-polygon inside the tile by replacing vertices of the primitive outside the tile with the intersection points comprises:
forming an initial sub-polygon inside the tile by replacing vertices of the primitive outside the tile with the intersection points; and
if the initial sub-polygon has more than three vertices, dividing the initial sub-polygon into a plurality of smaller sub-polygons, each having only three vertices, and wherein a bounding box is generated at sample precision for each smaller sub-polygon
and wherein testing each edge of the sub-polygon which is also part of an edge of the primitive against each sample point in the bounding box of the sub-polygon to determine if any sample point is inside the sub-polygon comprises:
for each smaller sub-polygon, testing each edge of the smaller sub-polygon which is also part of an edge of the primitive against each sample point in the bounding box of the smaller sub-polygon to determine if any sample point is inside the smaller sub-polygon.

11. The method according to claim 8, wherein testing each edge of the sub-polygon which is also part of an edge of the primitive against each sample point in the bounding box of the sub-polygon to determine if any sample point is inside the sub-polygon comprises:
computing edge parameters for each edge of the sub-polygon which is also part of an edge of the primitive; and
testing each sample point in the bounding box of the sub-polygon against each edge.

12. The method according to claim 2, wherein determining whether a primitive falls within a tile based on positions of samples within pixels in a tile further comprises:
generating any intersection points between edges of the primitive and boundaries of the tile;
forming a sub-polygon inside the tile by replacing vertices of the primitive outside the tile with the intersection points;
generating a bounding box of the sub-polygon at sample precision;
determining if the bounding box of the sub-polygon overlaps any samples in the tile; and
in response to determining that the bounding box of the sub-polygon overlaps any samples in the tile, determining that the primitive falls within the tile; and,
in response to determining that the primitive falls within the tile:
generating any intersection points between edges of the primitive and boundaries of the tile;
forming a sub-polygon inside the tile by replacing vertices of the primitive outside the tile with the intersection points;
generating a bounding box of the sub-polygon at sample precision;
testing each edge of the sub-polygon which is also part of an edge of the primitive against each sample point in the bounding box of the sub-polygon to determine if any sample point is inside the sub-polygon; and
in response to determining that any sample point is inside the sub-polygon, determining that the primitive falls within the tile.

13. The method according to claim 2, wherein determining whether a primitive falls within a tile based on positions of samples within a pixel further comprises:
determining how many vertices of the primitive fall within the tile;
in response to determining that two or more vertices fall within the tile, determining that the primitive falls within the tile;
in response to determining that less than two vertices fall within the tile, generating any intersection points between edges of the primitive and boundaries of the tile;
in response to generating more than two intersection points, determining that the primitive falls within the tile;
in response to generating exactly two intersection points for a primitive with only one vertex in the tile and where the intersection points are on different boundaries of the tile, determining that the primitive falls within the tile;
in response to generating exactly two intersection points for a primitive with no vertices in the tile and where the intersection points are on the same boundary of the tile or on different boundaries of the tile that do not cross within the primitive, determining that the primitive falls within the tile; and
in response to generating exactly two intersection points for a primitive with only one vertex in the tile and where the intersection points are on same boundary of the tile and in response to generating exactly two intersection points for a primitive with no vertices in the tile and where the intersection points are on different boundaries of the tile which cross within the primitive:
forming a sub-polygon inside the tile by replacing vertices of the primitive outside the tile with the intersection points;
generating a bounding box of the sub-polygon at sample precision;
determining if the bounding box of the sub-polygon overlaps any samples in the tile;

in response to determining that the bounding box of the sub-polygon overlaps any samples in the tile, determining that the primitive falls within the tile;

in response to determining that the bounding box of the sub-polygon does not overlap any samples in the tile, testing each edge of the sub-polygon which is also part of an edge of the primitive against each sample point in the bounding box of the sub-polygon to determine if any sample point is inside the sub-polygon; and in response to determining that any sample point is inside the sub-polygon, determining that the primitive falls within the tile.

14. The method according to claim 1, further comprising storing an association between the tile and the primitive by adding an identifier for the primitive to a control stream for the tile.

15. The method according to claim 1, further comprising storing an association between the tile and the primitive by adding an identifier for the tile to a tile list for the primitive.

16. The method according to claim 1, further comprising rendering primitives in a tile using a stored association, wherein the rendering is performed at each sample position within the tile.

17. A graphics processing system comprising a tiling unit for processing primitives for each of a plurality of tiles, the tiling unit being configured to:

determine whether a primitive falls within a tile based on positions of samples within pixels in the tile by:
generating a bounding box of the tile at sample precision; and
indicating that the primitive falls within the tile based on the generated bounding box of the tile.

18. The graphics processing system according to claim 17, wherein the tiling unit is further configured to determine whether the primitive falls within the tile based on the generated bounding box of the tile by:

generating a bounding box of the primitive at sample precision;

determining if the bounding boxes overlap; and in response to determining that the bounding boxes do not overlap, determining that the primitive does not fall within the tile.

19. The graphics processing system according to claim 17 wherein the graphics processing system is embodied in hardware on an integrated circuit.

20. A non-transitory computer readable storage medium having stored thereon a computer readable dataset description of an integrated circuit that, when processed in an integrated circuit manufacturing system, causes the integrated circuit manufacturing system to manufacture a graphics processing system comprising a tiling unit for processing primitives for each of a plurality of tiles, the tiling unit being configured to:

determine whether a primitive falls within a tile based on positions of samples within pixels in the tile by:
generating a bounding box of the tile at sample precision; and
indicating that the primitive falls within the tile based on the generated bounding box of the tile.

* * * * *